United States Patent [19]

Sikes

[11] Patent Number: 5,981,691
[45] Date of Patent: Nov. 9, 1999

[54] IMIDE-FREE AND MIXED AMIDE/IMIDE THERMAL SYNTHESIS OF POLYASPARTATE

[75] Inventor: C. Steven Sikes, Mobile, Ala.

[73] Assignee: University of South Alabama, Mobile, Ala.

[21] Appl. No.: 08/842,016

[22] Filed: Apr. 23, 1997

[51] Int. Cl.⁶ .................................................. C08G 69/10
[52] U.S. Cl. ........................ 528/328; 528/363; 562/553; 562/571; 525/432
[58] Field of Search .................. 528/328, 363; 562/553; 525/66, 432

[56] References Cited

U.S. PATENT DOCUMENTS

| | | | |
|---|---|---|---|
| 3,052,655 | 9/1962 | Fox et al. | 260/78 |
| 3,076,790 | 2/1963 | Fox et al. | 260/78 |
| 3,846,380 | 11/1974 | Fujimoto et al. | 360/78 A |
| 4,363,797 | 12/1982 | Jacquet et al. | 424/70 |
| 4,534,881 | 8/1985 | Sikes et al. | 252/180 |
| 4,585,560 | 4/1986 | Sikes et al. | 210/698 |
| 4,587,021 | 5/1986 | Wheeler et al. | 210/698 |
| 4,590,260 | 5/1986 | Harada et al. | 528/328 |
| 4,603,006 | 7/1986 | Sikes et al. | 252/180 |
| 4,696,981 | 9/1987 | Harada et al. | 525/328.2 |
| 4,839,461 | 6/1989 | Boehmke | 528/363 |
| 4,866,161 | 9/1989 | Sikes et al. | 530/324 |
| 4,868,161 | 9/1989 | Roberts | 514/49 |
| 4,868,287 | 9/1989 | Sikes et al. | 530/324 |
| 5,051,401 | 9/1991 | Sikes | 514/7 |
| 5,057,597 | 10/1991 | Koskan | 528/328 |
| 5,116,513 | 5/1992 | Koskan et al. | 210/698 |
| 5,152,902 | 10/1992 | Koskan et al. | 210/698 |
| 5,175,285 | 12/1992 | Lehmann et al. | 544/141 |
| 5,219,952 | 6/1993 | Koskan et al. | 525/419 |
| 5,221,733 | 6/1993 | Koskan et al. | 530/333 |
| 5,247,068 | 9/1993 | Donachy et al. | 530/350 |
| 5,260,272 | 11/1993 | Donachy et al. | 524/12 |
| 5,284,512 | 2/1994 | Koskan et al. | 106/416 |
| 5,284,936 | 2/1994 | Donachy et al. | 530/350 |
| 5,286,810 | 2/1994 | Wood | 525/421 |
| 5,288,783 | 2/1994 | Wood | 525/418 |
| 5,292,858 | 3/1994 | Wood | 528/345 |
| 5,292,864 | 3/1994 | Wood et al. | 528/490 |
| 5,296,578 | 3/1994 | Koskan et al. | 528/363 |
| 5,315,010 | 5/1994 | Koskan et al. | 548/520 |
| 5,319,145 | 6/1994 | Paik et al. | 528/328 |
| 5,328,690 | 7/1994 | Sikes | 424/401 |
| 5,329,020 | 7/1994 | Kalota et al. | 548/520 |
| 5,350,735 | 9/1994 | Kinnersley et al. | 504/147 |
| 5,357,004 | 10/1994 | Calton et al. | 525/435 |
| 5,367,047 | 11/1994 | Wood | 528/363 |
| 5,371,177 | 12/1994 | Paik et al. | 528/361 |
| 5,371,179 | 12/1994 | Paik et al. | 528/363 |
| 5,371,180 | 12/1994 | Groth et al. | 528/363 |
| 5,373,088 | 12/1994 | Koskan et al. | 528/363 |
| 5,380,817 | 1/1995 | Paik et al. | 528/328 |
| 5,391,642 | 2/1995 | Wood | 525/435 |
| 5,391,764 | 2/1995 | Koskan et al. | 548/520 |
| 5,393,868 | 2/1995 | Freeman et al. | 528/480 |
| 5,401,428 | 3/1995 | Kalota et al. | 252/49.3 |
| 5,408,028 | 4/1995 | Wood et al. | 538/328 |
| 5,410,017 | 4/1995 | Bortnick et al. | 528/363 |
| 5,424,391 | 6/1995 | Paik et al. | 528/328 |
| 5,442,038 | 8/1995 | Wood et al. | 528/363 |
| 5,443,651 | 8/1995 | Kalota et al. | 134/2 |
| 5,449,748 | 9/1995 | Ramsey | 530/300 |
| 5,457,176 | 10/1995 | Adler et al. | 528/328 |

(List continued on next page.)

OTHER PUBLICATIONS

Herrera, *Science*, vol. 96, p. 14 (1942).
Katchalski, *Advances in Protein Chemistry*, vol. 6, pp. 123–185 (1951).
Fox et al, *Science*, vol. 128, p. 1214 (1958).
Fox et al, *A Laboratory Manual of Analytical Methods of Protein Chemistry*, P. Alexander and H. P. Lundgren, eds., vol. 4, Pergamon Press, Oxford, pp. 127–151 (1966).
Harada, *Journal of Organic Chemistry*, vol. 24, pp. 1662–1666 (1959).
Pivcova et al, *Biopolymers*, vol. 20, pp. 1605–1614 (1981).
Pivcova et al, *Polymer Reports*, vol. 23, pp. 1237–1241 (1982).
Saudek et al, *Biopolymers*, vol. 20, pp. 1615–1623 (1981).
Wolk et al, *Macromoleculess*, vol. 27, pp. 7613–7620 (1994).
Freeman et al, in *Hydrogels and Biodegradable Polymers for Bioapplications*, R. M. Ottenbrite et al, Eds., ACS Symposium Series 627, American Chemical Society, Washington, D.C., pp. 119–136 (1996).
Matsubara et al, *Polymer Preprints*, Spring 1996, pp. 699–700.
Neri et al, *Journal of Medicinal Chemistry*, vol. 16, pp. 893–897 (1973).
Termine et al, *Archives of Biochemistry and Biophysics*, vol. 140, pp. 307–317 (1970).
Termine et al, *Calcif. Tis. Res.*, vol. 22, pp. 149–157 (1976).
Sarig et al, *Desalination*, vol. 17, pp. 215–299 (1975).
Kokufuta et al, *BioSystems*, vol. 9, pp. 211–214 (1977).
English Abstract of JP 8277329 (Oct. 22, 1996).
Notification of Transmittal of the International Search Report or the Declaration issued in corresponding PCT Application No. PCT/US98/07630 on Jul. 8, 1998.
Saudek, *Biopolymers*, vol. 20, 1625–1633 (1981).
Eisenreich et al, *Environmental Letters*, vol. 9, pp. 43–53 (1975).
*The Merck Index*, 10th Ed., Martha Windholz, Ed., No. 853, p. 121 (1983).
*CRC Handbook of Chemistry and Physics*, 68th Ed., Robert C. Weast, Ph.D., Ed., p. C–699 (1998).
Termine et al, *Archives of Biochemistry and Biophysics*, vol. 140, 318–325 (1970).

*Primary Examiner*—Cecilia J. Tsang
*Assistant Examiner*—David Lukton
*Attorney, Agent, or Firm*—Oblon, Spivak, McClelland, Maier & Neustadt, P.C.

[57] ABSTRACT

Thermal polymerization of a salt of aspartic acid affords polyaspartate directly without hydrolyzing polysuccinimide. Copolymerization of a salt of aspartic acid with aspartic acid itself affords a copolymer of succinimide and aspartate which may be readily derivatized to produce a sulfonated, phosphonated or hydrophobized polymer.

47 Claims, 10 Drawing Sheets

U.S. PATENT DOCUMENTS

| | | | |
|---|---|---|---|
| 5,463,017 | 10/1995 | Paik et al. | 528/361 |
| 5,466,760 | 11/1995 | Wood | 525/435 |
| 5,466,779 | 11/1995 | Ross | 528/363 |
| 5,468,838 | 11/1995 | Boehmke et al. | 528/363 |
| 5,470,843 | 11/1995 | Stahl et al. | 514/61 |
| 5,470,942 | 11/1995 | Alexander et al. | 528/328 |
| 5,478,919 | 12/1995 | Koskan et al. | 528/363 |
| 5,484,860 | 1/1996 | Wood et al. | 525/432 |
| 5,484,878 | 1/1996 | Paik et al. | 528/328 |
| 5,484,945 | 1/1996 | Nagamoto et al. | 548/520 |
| 5,488,088 | 1/1996 | Wood et al. | 525/432 |
| 5,491,212 | 2/1996 | Paik et al. | 528/363 |
| 5,491,213 | 2/1996 | Batzel | 528/480 |
| 5,493,004 | 2/1996 | Groth et al. | 528/363 |
| 5,494,995 | 2/1996 | Wood et al. | 528/328 |
| 5,496,914 | 3/1996 | Wood et al. | 528/328 |
| 5,502,117 | 3/1996 | Wood | 525/435 |
| 5,506,335 | 4/1996 | Uhr et al. | 528/322 |
| 5,508,434 | 4/1996 | Batzel et al. | 548/520 |
| 5,510,426 | 4/1996 | Wood | 525/435 |
| 5,510,427 | 4/1996 | Wood | 525/435 |
| 5,522,863 | 6/1996 | Spano et al. | 607/45 |
| 5,523,023 | 6/1996 | Kleinstuck et al. | 252/542 |
| 5,525,257 | 6/1996 | Kleinstuck et al. | 252/181 |
| 5,530,091 | 6/1996 | Wagner et al. | 528/328 |
| 5,531,934 | 7/1996 | Freeman et al. | 252/390 |
| 5,536,813 | 7/1996 | Charpenel et al. | 530/324 |
| 5,543,490 | 8/1996 | Groth et al. | 528/328 |
| 5,543,491 | 8/1996 | Wood et al. | 528/328 |
| 5,548,036 | 8/1996 | Kroner et al. | 525/419 |
| 5,552,514 | 9/1996 | Adler et al. | 528/328 |
| 5,552,516 | 9/1996 | Ross et al. | 528/363 |
| 5,552,517 | 9/1996 | Martin | 528/363 |
| 5,554,721 | 9/1996 | Adler et al. | 528/328 |
| 5,556,938 | 9/1996 | Freeman et al. | 528/328 |
| 5,587,146 | 12/1996 | Wood et al. | 424/49 |
| 5,593,947 | 1/1997 | Kinnersley et al. | 504/283 |
| 5,594,077 | 1/1997 | Groth et al. | 525/451 |
| 5,648,082 | 7/1997 | Sikes | 424/401 |
| 5,681,920 | 10/1997 | Vallino et al. | 528/328 |
| 5,773,564 | 6/1998 | Sikes | 528/363 |

IMIDE-FREE AND MIXED AMIDE/IMIDE THERMAL SYNTHESIS OF POLYASPARTATE

BACKGROUND OF THE INVENTION

1. Field of the Invention

The present invention relates to the thermal synthesis of polyaspartate without formation of the intermediate polysuccinimide. Included are methods for preparing mixed amide/imide copolymers with varying amounts of aspartate and succinimide residues. Some of the amide/imide copolymers are water-soluble. Derivatives of the copolymers can be made by nucleophilic addition of amine groups of additive monomers to open the imide rings of polymer residues to produce, for example, sulfonated, phosphonated, sulfated, phosphated and hydrophobized polyaspartates in water. The materials of the invention are useful in many applications including but not limited to dispersants, detergent builders, antiredeposition agents, antiscalants, corrosion inhibitors, chelating agents, plant growth enhancers, fertilizers, cosmetic additives, tartar control agents, ion-exchange resins, chromatographic materials, and others.

2. Discussion of the Background

Early reports of experiments with thermal polymerization of polyaspartic acid from both precursors of aspartic acid (Dessaignes, M., Comptes Rendue, vol. 30, pp. 324–325 (1850); and Comptes Rendue, vol. 31, pp. 432–433 (1850)) and aspartic acid itself (Schiff, H. Chemische Berichte, vol. 30, pp. 2449–2459 (1898)) were sketchy and necessarily incomplete in description of the reactions, the intermediates, and the products. The number of experimental studies increased when thermal polymerization of amino acid precursors and amino acids became conceptually linked to theories of the origin of life in the middle of the next century (Herrera, A. L. Science, vol. 96, p. 14 (1942); Katchalski, E. Advances in Protein Chemistry, vol. 6, pp. 123–185 (1942); Kovacs, J., et al., Experientia, vol. 9, pp. 459–460 (1953); Fox, S. W., et al., Science vol. 128, p. 1214 (1959); Fox, S. W., et al., in, A Laboratory Manual of Analytical Methods of Protein Chemistry, P. Alexander and H. P. Lundgren, eds., Volume 4, Pergamon Press, Oxford, pp. 127–151 (1966); and Harada, K., Journal of Organic Chemistry, vol. 24, pp. 1662–1666 (1959). The reactions involved in the thermal synthesis of polymers and copolymers of aspartic acid and comonomers became more clear based on infrared spectra, solubilities, and titration data of the reaction intermediates and products. The thermal polymerization of aspartic acid, or precursors of aspartic acid, proceeds through a polyimide intermediate followed by mild alkaline hydrolysis to produce the polyamide polyaspartate.

As NMR techniques were applied to characterize the intermediates and products, the mixed α, β nature of the residues became well known (Pivcova, H., et al., Biopolymers, vol. 20, pp. 1605–1614 (1981); Pivcova, H., et al., Polymer Reports, vol. 23, pp. 1237–1241 (1982); and Saudek, V., et al., Biopolymers, vol. 20, pp. 1615–1623 (1981)), as well as the possibility of occurrence of branch points along the polymer chain (Wolk, S. K., et al., Macromolecules, vol. 27, pp. 7613–7620 (1994); Freeman, M. B., et al., in Hydrogels and Biodegradable Polymers for Bioapplications, R. M. Ottenbrite, et al., Eds., ACS Symposium Series 627, American Chemical Society, Washington, D.C., pp. 119–136 (1996); U.S. Pat. No.5,548, 036 (Kroner et al.); U.S. Pat. No. 5,536,813 (Charpenel et al.); and Matsubara, K., et al., Polymer Preprints, Spring 1996, pp. 699–700). The mixed L, D optical nature of the residues was already known from measurements of refractive index (Kovacs, J., et al., Naturwissenschaften, vol. 41, p. 333 (1954)).

The potential of polyaspartate and its derivatives as biodegradable alternatives to polyacrylates for uses in such fields as detergents, superabsorbents, water treatment, agriculture, oilfield, cosmetics, health care products, food additives, and others resulted in a few early patents, with increased patenting to the present time. The synthetic approaches relative to polyaspartates that are disclosed in the patent literature are summarized below.

U.S. Pat. No. 3,052,655 to Fox and Harada (1962) teaches the copolymerization of aspartic acid, precursors to aspartic acid, and other amino acids by heating admixtures at 160 to 210° C. for 1 to 3 hours or a time sufficient to form a polyimide. If $H_3PO_4$ were added in an equimolar amount or less relative to the amounts of amino acids, products with higher molecular weights were achieved at lower reaction temperatures. The polyimide was then dissolved by mild alkaline at 80° C. for 10 minutes.

U.S. Pat. No. 3,076,790 to Fox and Harada (1963) is similar to the above patent but emphasized also glutamic acid as a comonomer that first is heated to form a melt of pryoglutamic acid to which the other residues were added. The use of glutamic acid as a solvent/comonomer reportedly expedited the reaction.

U.S. Pat. No. 3,846,380 to Fujimoto and Teranishi (1974) discloses the thermal polymerization of aspartic acid in tetralin and also aspartic acid precursors including malic, maleic, and fumaric acids plus ammonia without solvents at about 190° C. for up to 40 hours. The resulting polyimide was dissolved in dimethyl formamide to which was added a primary or secondary amine compound. The amine formed an amide across either side of the imide linkage to produce a derivative of the polysuccinimide. This was then subjected to alkaline hydrolysis to produce derivatives of polyaspartic acid, particularly having hydrophobic side chains such as lauryl, oleyl, and palmityl groups. The derivatives were described as being useful in detergents and cosmetics, with various other uses taught as well. A similar reaction of polysuccinimide, prepared by thermal polymerization of aspartic acid in $H_3PO_4$, with ethanolamine for use as a plasma expander was reported by Neri, Paolo, et al., in Journal of Medicinal Chemistry, vol. 16, pp. 893–897 (1973), who also summarized syntheses of polysuccinimides and reactivity with organic amines.

U.S. Pat. No. 4,363,797 to Jacquet et al. (1982) teaches the production of a polysuccinimide by thermal polymerization in $H_3PO_4$ of aspartic acid at 180° for several hours under partial vacuum in a rotary evaporator, followed by derivatization with a variety of primary amines. The amines included cysteamine, which after addition to the polymer was oxidized with 30% hydrogen peroxide to the sulfonate. Similarly, a solution of the polysuccinimide in DMF was treated with aminoethylsulfonate (sodium taurine) to produce a sulfonated derivative. In some cases, the polyimide polymers were alkaline hydrolyzed to produce the polyaspartate derivatives; in other cases they were described as derivitized polysuccinimides for use in shampoo and other hair products.

U.S. Pat. No. 4,534,881 to Sikes and Wheeler (1985) describes the synthesis of polyamino acids, including polyaspartic acid, by a variety of methods. For example, polymerization of N-carboxyanhydides leads to polyamino acids without imide intermediates whereas thermal polymerization of aspartic acid produced the polysuccinimide, which required alkaline hydrolysis to form the α, β polyaspartate from Sigma Chemical Co., as used in the examples. The materials were claimed for use in prevention of $CaCO_3$-containing deposits on surfaces. Previously, Termine and coworkers (Termine, J. D., et al., *Archives of Biochemistry and Biophysics,* vol. 140, pp. 307–317 and 318–325 (1970); and Termine, J. D., et al., *Calcified Tissue Research,* vol. 22, 149–157 (1976)) had studied inhibition of calcium phosphate formation by polyglutamate, and Sarig and coworkers (Sarig, S., et al., *Desalination,* vol. 17, pp. 215–229 (1975); and Sarig, S., et al., *Israel National Council for Research and Development Report,* pp. 150–157 (1977)) had demonstrated inhibition of formation of $CaSO_4$ and other undefined scales from seawater by polyaspartate, polyglutamate, and sulfonated polymers.

U.S. Pat. No. 4,590,260 to Harada and Shimoyama (1986) discloses the copolymerization of admixtures of monoammonium or diammonium salts of aspartic acid precursors such as malate, maleate, fumarate, and monoammonium salts of malic, maleic, and fumaric monoamide. Reactions typically were conducted without solvents for 2 to 6 hours at 160° to 190° C. to produce copolymers of amino acids and succinimide, which were then alkaline hydrolyzed to the copolyaspartates. Use of catalysts such as phosphoric, phosphonic, sulfuric, and sulfonic acids were also mentioned for promotion of polymerization.

U.S. Pat. No. 4,696,981 to Harada et al. (1987) describes the use of microwaves for polycondensation of polysuccinimide from admixtures of one or more of monoammonium, diammonium, monoamide, diamide, or monoamidoammonium salts of malic, maleic, and fumaric acids. Copolymers of succinimide and one or more amino acids were also made in this way. The materials were converted to polyaspartate and aspartate-containing copolymers by mild alkaline hydrolysis.

U.S. Pat. No. 4,839,461 to Boehmke (1989) reports the use of maleic anhydride plus water to produce maleic acid plus ammonia in a ratio of 1:1 to 1:1.5 of maleic to ammonia. This solution was dried, then heated in vacuo or with a stream of inert gas for 4–6 hours at 120 to 140° C. to polymerize the material and carry away the water of condensation. The formation of polysuccinimide was not mentioned; however, the product was subjected to neutralization under conditions of mild alkaline hydrolysis. The salts of polyaspartate so produced were described as being useful for removal and prevention of mineral scale deposits, or for use as a fertilizer. See also U.S. Pat. Nos. 5,350,735 and 5,593,947 to Kinnersley et al. (1994, 1997) about use of polyaspartate for promotion of growth of plants.

U.S. Pat. Nos. 4,866,161 and 4,868,287 to Sikes and Wheeler (1989) disclose the synthesis of polyaspartate by solid-phase methods, as well as thermal polymerization of R-group protected monomer. These methods require many steps including deprotection of the R-groups by acid hydrolysis to produce polyaspartic acid, but do not generally involve imide formation. The polyaspartic domains were linked to hydrophobic domains to produce the desired materials of the inventions for use in inhibition of mineral deposition, including tartar formation.

U.S. Pat. No. 5,051,401 to Sikes (1991) describes the synthesis of polyaspartate by solid-phase methods as well as by dry thermal polymerization of aspartic acid at 190° C. for 24 hours. By the solid-phase method, polyaspartate was produced without formation of polysuccinimide. However, R-group protected monomers were used, and many reaction steps and solvents were required. The polysuccinimide was produced in the dry thermal method, requiring the alkaline hydrolysis to convert to polyaspartate. Addition of phosphated, phosphonated, sulfated, and sulfonated residues to aspartate-rich polymers were also taught, especially the utility of terminally locating these comonomers. Utility in inhibition of mineral deposition was claimed.

U.S. Pat. No. 5,057,597 to Koskan (1991), discloses a process for manufacture of polysuccinimide by treatment of aspartic acid at about 220° C. for several hours. The method provided for a fluidized bed of the reactant. The polysuccinimide was subjected to mild alkaline hydrolysis to produce polyaspartate.

U.S. Pat. No. 5,116,513 to Koskan and Low (1992) teaches the dry, thermal polymerization of aspartic acid to produce polysuccinimide followed by alkaline hydrolysis to produce polyaspartic acid for use as an inhibitor of precipitation of calcium sulfate and barium sulfate.

U.S. Pat. No. 5,152,902 to Koskan et al. (1992) discloses the dry, thermal polymerization of aspartic acid to produce a polysuccinimide followed by mild alkaline hydrolysis to produce polyaspartic acid for use as an inhibitor of precipitation of calcium carbonate and calcium phosphate.

U.S. Pat. Nos. 5,219,952; 5,296,578; and 5,373,088 to Koskan and Meah (1993, 1994) disclose the synthesis of polysuccinimide by mixing maleic anhydride with aqueous ammonia at ratios ranging up to 1:12, maleic:ammonia, with a ratio of 1 to 2–3 preferred. The solution was dried and heated at 130° C. for 4 hours to produce an incompletely polymerized intermediate mixture of polysuccinimide and other reactants. Emphasis was placed on reaction temperatures of 220° to 260° C. for production of greater than 90% of theoretical yield over periods of 7 hours or more. In addition, prepolymerized polysuccinimide was added and the admixture produced at 130° C. for 4 hours was further heated for up to 12 hours at 220° C. to complete the polymerization, yielding a relatively higher MW polysuccinimide. The polysuccinimides were base hydrolyzed to produce polyaspartate.

U.S. Pat. Nos. 5,221,733; 5,315,010; and 5,391,764 to Koskan et al. (1993, 1994, 1995) disclose a process for the dry, thermal synthesis of polysuccinimide by heating aspartic acid in a rotary dryer at 240° to 260° C. for 1 to 3 hours. Polyaspartic acid was produced by mild alkaline hydrolysis of the polysuccinimide.

U.S. Pat. Nos. 5,247,068; 5,260,272; and 5,284,936 to Donachy and Sikes (1993, 1994) teach the dry, thermal polymerization to form the polysuccinimide, then alkaline conversion to the polyaspartate. The prepolymerized polyaspartate was then used as a backbone to which other comonomers and crosslinkers were added by further thermal treatment. In a preferred example, the materials were again subjected to mild alkaline hydrolysis to produce the fully active polyaspartate forms. The materials were described as being useful as inhibitors of mineral formation or as superabsorbents.

U.S. Pat. No. 5,284,512 to Koskan and Low (1994) discloses the use of polyaspartate as a dispersant of mineral particles. The polyaspartate was prepared by mild alkaline hydrolysis of polysuccinimide that was synthesized by dry, thermal polymerization.

U.S. Pat. Nos. 5,286,810; 5,288,783; 5,292,858; 5,367,047; 5,391,642; 5,466,760; 5,510,426 and 5,510,427 to Wood (1994, 1995, 1996) and 5,292,864 to Wood and Calton (1994) disclose heating aspartic acid or aspartic acid precursors such as monoammonium maleate, monoammonium fumarate, diammonium maleate, diammonium fumarate, maleic acid and ammonia, maleic anhydride and ammonia along with comonomers like primary and secondary diamines and polyamines, or with an alcohol and an aminohydrocarbon like oleyl amine. In some experiments, polysuccinimides were produced at temperatures up to 300° C. for periods as short as 5 minutes and less. In all cases involving copolymers, succinimide-containing materials also were produced. All products were converted to the polyaspartate forms by mild alkaline hydrolysis. In some cases, the color of the polyaspartate forms were lightened by treatment with oxidants like hypochlorite, hydrogen peroxide, or ozone.

U.S. Pat. Nos. 5,319,145; 5,371,177; 5,371,179; 5,380, 817; 5,463,017; 5,484,878; and 5,491,212 to Paik et al. (1994, 1995, 1996) disclose processes for preparing polysuccinimide by heating maleamic acid or aspartic acid, in some cases in the presence of polyalkylene glycol, at up to 270° for up to fifteen hours. Aspartic acid precursors like monoammonium maleate, as well as other amino acids, were envisioned for use as monomers or comonomers. Co-reactants like mesaconic acid and related carboxylates were also disclosed. A rotary tray dryer was exemplified as a preferred device for heating. The polysuccinimides were converted by mild alkaline hydrolysis to polyaspartates in some cases. Suggested uses included cleaning agents, detergent additives, dispersants, water treatment additives, and others.

U.S. Pat. No. 5,328,690 to Sikes (1994) teaches the synthesis of polyaspartate by solid-phase methods and by thermal condensation of aspartic monomer, with or without protecting groups. The thermal method produced polysuccinimide which was base hydrolyzed to the polyaspartate. Hydrophobic domains of amino acids such as alanine were also added to the polyaspartates, as well as other anionic residues, to produce dispersants for use in detergents, shampoos, cosmetics, among other uses.

U.S. Pat. No. 5,329,020 to Kalota and Martin (1994) describe a process for the thermal production of polysuccinimide by heating aspartic acid at about 300° C. in the presence of a catalytic amount of $CO_2$, as low as 5% by volume circulating in air, for about 1 to 2 hours in a tray dryer. The polysuccinimide was converted to polyaspartate by mild alkaline hydrolysis.

U.S. Pat. No. 5,357,004 to Calton and Wood (1994) discloses the thermal polymerization of maleic acid, ammonia, alkyl amines and also polyamines, with up to 2:1 molar ratio of ammonia to maleic. The admixtures were heated to temperatures as high as to 245° C. for about 30 min. One example included maleic acid, ammonia, and taurine (aminoethylsulfonate) in a molar ratio of 1:1:0.1. The resulting imide-containing materials were converted to aspartate-containing materials by mild alkaline hydrolysis. Uses as crystallization inhibitors, dispersants, and foaming agents were exemplified.

U.S. Pat. No. 5,371,180 to Groth et al. (1994) teaches a process for the preparation of polysuccinimide by mixing maleic anhydride and ammonium carbonate or urea in a molar ratio of about 2:1 maleic:diammonium compound, feeding the mixture to a self-cleaning, twin-screw extender at about 175° C. with a residence time as short as 5 minutes and up to 300 minutes. In one experiment, sodium carbonate was also added to the admixture in a ratio of 2:1.1:0.25 of maleic:urea:$Na_2CO_3$. A mixed polymer of succinimide and aspartate was produced. In all cases, the polysuccinimides and succinimide-containing copolymers were converted to the polyaspartates by mild alkaline hydrolysis. Uses as a sequestration agent for a surfactant, alkylbenzyl sulfonate, and as a dispersant of zinc oxide were exemplified. Other uses such as scale and corrosion inhibition, especially of brass, and as microbiocides were mentioned.

U.S. Pat. No. 5,393,868 to Freeman et al. (1995) discloses heating maleamic acid in the presence of a processing aid such as zeolites, sodium sulfate, and citric acid to reduce foaming, reduce viscosity, promote heat transfer, and enhance removal of water during the reactions. Temperatures of condensation ranged up to 290° C. for periods from 10 minutes to 2 hours. The invention primarily emphasized use of polysuccinimides in detergents. Conversion to polyaspartates was not part of the experimentation, although it was mentioned in the presentation of the background of the invention.

U.S. Pat. No. 5,401,428 to Kalota et al. (1995) describes the use of thermally polymerized aspartic acid as a lubricant in cutting, threading, and shaping metals such as iron, brass, and aluminum. The polysuccinimides were alkaline hydrolyzed to the polyaspartates prior to use. The polyaspartates were described as providing the environmental benefit of biodegradability on disposal, as well as obviating costs associated with dispersal of oil-based, metal-working fluids. U.S. Pat. No. 5,443,651 to Kalota and Sherman (1995) teach the use of the same polyaspartic acids at pH of about 7 or less as a cleansing agent for ferrous metal surfaces.

U.S. Pat. Nos. 5,408,028; 5,442,038; 5,527,863, 5,543, 491; and 5,587,146 to Wood and Calton (1995, 1996) disclose the thermal polymerization of maleic anhydride in water and ammonia over the range of ratios from 20:1 to 1:2 of maleic to $NH_3$. Temperatures ranged up to about 245° for up to about 1 hour. In some cases, copolymers were presumed to have been made by addition of comonomers like citric acid, succinic acid, hexanediamine, lysine, ethylenediamine, diethylene triamine, oleic acid, and oleyl amine in amounts typically around a molar ratio of maleic::comonomer of 16:1 or less. The polysuccinimides that resulted were base hydrolyzed to polyaspartates prior to testing for uses such as scale inhibition, dispersion of kaolin, and tartar control.

U.S. Pat. No. 5,410,017 to Bortnick et al. (1995) discloses the thermal polycondensation of maleic anhydride and ammonia at about 220° C. for short periods; for example, 15 seconds. The maleic anhydride was fluidized at about 130° C. The reactants were admitted to a reactor via a T-shaped tube, with a second T-shaped tube available for introduction of a processing aid such as polyethylene glycol. The ratio of ammonia to monomer was up to 1:5. Low MW polysuccinimides were produced (GPC MW<2000, polyacrylate MW 4500 as standard). Hydrolysis of the polysuccinimides to produce polyaspartic acids was discussed. Uses of the materials as detergent additives, pigment and mineral dispersants, additives to fertilizers, corrosion inhibitors, and antiscalants were mentioned.

CA 2136517 to Bernard et al. (1995) teaches the polymerization of aspartic acid in the presence of $KHSO_4$ at 200° C. for 7 hours to produce a polysuccinimide. When hydrolyzed, a polyaspartate that was approximately 90% biodegradable was produced. The materials were described for use in detergents.

U.S. Pat. No. 5,424,391 to Paik et al. (1995) discloses the production of polysuccinimide by heating fumaramic acid for up to about 6 hours, sometimes in the presence of solvents like sulfolane or diluents like tetrahydronapthalene. The polysuccinimides were tested for utility in soil removal and antiredeposition in a detergent formulation. Polyaspartates were mentioned, but not used in the experiments.

JP 07196790 to Fujii and Nishibayashi (1995) discloses the dispersion of aspartic acid in 25% aqueous ammonia to provide ionization of 2% of the carboxyl groups, followed by drying by vacuum distillation, then polymerization at 250° for 60 minutes. A polysuccinimide was produced, which was alkaline hydrolyzed to a polyaspartate of MW 9000. The object of the invention was to gain control over the MW of the products without strict control of temperature.

U.S. Pat. No. 5,449,748 to Ramsey (1995) teaches the formation of polysuccinimide by heating aspartic acid for less than 10 minutes at temperatures up to 400° C. The polysuccinimides were discussed as precursors to polyaspartic acid for use in detergents, as dispersants, and as scale inhibitors. A continuous process, including use of acid catalysts like $H_3PO_4$, was envisioned.

U.S. Pat. Nos. 5,457,176; 5,552,514; and 5,554,721 to Adler et al. (1995, 1996) and 5,556,938 to Freeman et al. (1996) disclose a process for preparing polysuccinimides by heating aspartic acid in the presence of an acid catalyst like $H_3PO_4$ at temperatures of about 240° C. for about 6 hours. Processing aids like zeolites and sodium sulfate were also added to the mixture before heating. Other amino acids were mentioned as possible reactants, but were not exemplified. The polysuccinimides were base hydrolyzed to form the polyaspartates, which were tested for utility in detergents, as antiscalants, and dispersants. Corrosion inhibition was also claimed, but not exemplified. Biodegradability up to 100% was demonstrated for some of the polyaspartates. Utility of polyaspartates as antiscalants and dispersants in drilling mud and oil production were indicated.

U.S. Pat. No. 5,466,779 to Ross (1995) discloses the production of polysuccinimide by reaction of liquid maleic anhydride with ammonia then heating at up to 260° C. for about 1 to 2 hours. The polysuccinimides were base hydrolyzed to form polyaspartates. An intermediate in the process was shown to be maleamic acid, based on the infrared spectrum.

U.S. Pat. No. 5,468,838 to Boehmke and Schmitz (1995) describes the formation of polysuccinimide by heating maleic anhydride, aqueous ammonia, and a solubilizing agent such as an ethylene oxide adduct of a fatty alcohol to form a melt which was then dried. The dry mass was heated at up to 150° C. for up to 5 hours. The polysuccinimide was base hydrolyzed to form polyaspartate. The solubilizing agents improved the handling properties of the melt, such as stickiness, stirrability, antifoaming, as well as improving heat transfer. They may also intensify the action of polyaspartate as dispersants and detergent additives.

U.S. Pat. No. 5,470,843 to Stahl et al. (1995) teaches the synthesis of polysuccinimide by thermal polymerization in $H_3PO_4$ followed by derivatization with many compounds including diaminobutane, ethanolamine, and a large variety of carbohydrates. The polysuccinimide-containing materials were base hydrolyzed to polyaspartate-containing ones. The materials were described as useful as cell adhesion factors or inhibitors, as carriers of therapeutic agents to the tissues, and other uses.

U.S. Pat. No. 5,470,942 to Alexander et al. (1995) discloses the formation of polysuccinimide by mixing aspartic acid and a phosphonic acid in water to form a blend or solution, drying this mixture, then heating at about 200 to 250° C. for about 2 to 3 hours. The molar ratio of aspartic to phosphonic acid was about 10:1. The resultant polysuccinimide was base hydrolyzed to form polyaspartate. The materials were suggested for use in detergents, as water treatment chemicals, and in oil-field applications.

U.S. Pat. No. 5,478,919 to Koskan et al. (1995) discloses the copolymerization of aspartic acid precursors like monoammonium maleate, or maleic anhydride plus ammonium carbonate, with comonomers like citric acid, succinic acid, lactic acid, diethyl triamine, and others. The dry, or slightly wet, mixtures were heated at 230 to 250° C. for 40 to 60 minutes to form polysuccinimide-containing materials, which were base hydrolyzed to produce polyaspartate-containing copolymers. A number of uses of the materials were mentioned, for example, as detergent additives, scale inhibitors, dispersants, additives for cosmetics, corrosion inhibitors, and fertilizer enhancers.

U.S. Pat. Nos. 5,484,860; 5,488,088; 5,494,995; 5,496,914; and 5,502,117 to Wood and Calton (1996) discloses the formation of copolymers of polysuccinimide and a variety of other comonomers such as citric acid, succinic acid, polyamines, and amino acids such as lysine, alanine, and glutamic acid. The comonomer or comonomers were mixed with monoammonium or diammonium maleate; prepared from maleic anhydride, water, and ammonia; and heated to dryness, then about to about 240° C. for about 30 minutes to produce the polysuccinimides. These were base hydrolyzed to form the polyaspartates. The materials were indicated as useful in applications like detergents, scale control, fertilizers, tartar control, cosmetics, and others.

U.S. Pat. No. 5,484,945 to Nagatomo et al. (1996) discloses a process for the preparation of polysuccinimide which was termed an intermediate in the synthesis of polyaspartic acid and its derivatives. Polyaspartic acid itself was not prepared. The polysuccinimides were thermally polymerized from aspartic acid at 180 to 210° C. for up to 16 hours in organic solvents such as diphenyl ether to which catalysts such as magnesium oxide and phosphoric acid were added in some cases. The water of dehydration was removed and the organic solvent returned through an azeotropic distillation procedure.

U.S. Pat. No. 5,491,213 to Batzel (1996) discloses a method for preparing polysuccinimide by heating an admixture of maleic anhydride and a thermally decomposable ammonium salt in a ratio of 1:1 to 1:1 of maleic:ammonium salt. The ammonium compounds included, for example, ammonium carbonate, ammonium sulfate, ammonium phosphate and others. Temperatures ranged up to 240° C. for times of about 2 hours. The polysuccinimides were base-hydrolyzed to produce polyaspartates.

U.S. Pat. No. 5,493,004 to Groth et al. (1996) teaches a process for preparation of polysuccinimide by use of a tubular reactor in which maleic anhydride plus water and ammonia were introduced at a high rate of flow and mixing through a nozzle under pressure with heating. Temperatures ranged up to 330° C. with residence times as low as six seconds, with 180° C. for 10 minutes as a preferred example. Polysuccinimides with small amounts of polyaspartic acids as by products were produced. These were hydrolyzed to the polyaspartates by mild alkaline hydrolysis. In one example in which the ratio of ammonia to maleic was as high as 2.5:1, polyasparagine was the main product, with polysuccinimide as a byproduct. These materials were also converted by mild alkaline hydrolysis to polyaspartate. Various properties of the materials were listed such as dispersancy, sequestering, corrosion inhibition; an antimicrobial action versus bacteria and fungi was also detected.

JP 08059821 to Hattori and Mori (1996) discloses polymerization of aspartic acid in a paraffin mixture at 220° C. for 4 hours to produce polysuccinimide. After purification and alkaline hydrolysis, a relatively high MW (24,000) polyaspartate was produced.

DE 4434463 to Kroner and Schornick (1996) discloses the copolymerization of aspartic acid and citric acid in the presence of ammonia at a 1:1:1 ratio by mixing the reactants in water, drying, then heating at 160° C. for 2 hours. Mild alkaline hydrolysis was used to convert imide residues to aspartate. The product was a low MW (1500) copolymer and was described as useful as a complexing agent.

U.S. Pat. No. 5,506,335 to Uhr et al. (1996) describes the preparation of sulfonated derivatives of polyaspartate, for example, by addition of aminomethylsulfonic acid to polysuccinimide in dimethyl formamide. The product was isolated by filtration, washed, then converted to the polyaspartate form by mild alkaline hydrolysis. Utility as a dispersant of $CaCO_3$ was exemplified, and many other uses were mentioned such as antiscaling, corrosion inhibition, detergency, oral health care, and others.

U.S. Pat. No. 5,508,434 to Batzel et al. (1996) teaches a method for preparing polysuccinimide by heating an admixture of aspartic acid and sulfur-containing dehydrating agents like sulfur trioxide, sulfonic acids, and sodium bisulfate. In some cases, an acid-scavenging agent such as boric acid was added to promote somewhat higher molecular weights of the products. Temperature and times of polymerization were typically about 170° C. and 2.5 hours. Polyaspartates were produced by alkaline hydrolysis of the polysuccinimides.

U.S. Pat. Nos. 5,523,023 and 5,525,257 to Kleinstück et al. (1996) disclose polyaspartates prepared from thermally synthesized polysuccinimides in conjunction with other polyanions like polyacrylate and phosphonobutane tricarboxylate. Uses claimed were in water treatment, alkaline cleansers, dishwashers, and oil-field applications.

WO 9619524 to Nakato et al. (1996) describes the thermal polycondensation of maleic anhydride and ammonia in the presence of phosphoric acid by refluxing in trimethyl benzene (mesitylene). This produced a polysuccinimide which was treated with aqueous NaOH to obtain sodium polyaspartate of MW 4200. Uses envisioned for the product were chelating agent, flocculant, antiscalant, detergent builder, dispersant, humectant, fertilizer additive, and raw material for biodegradable polymers.

U.S. Pat. No. 5,530,091 to Wagner et al. (1996) teaches the synthesis of polysuccinimide by passing droplets of molten maleic anhydride through gaseous ammonia at temperatures up to 250° C. Although conversions exemplified were only about 50%, reaction times were only 50 seconds or less and the temperature was limited to 160° C. At temperatures of 120° C. or less, monomeric maleic amide rather than polysuccinimide was produced. Polyaspartate was made by mild alkaline hydrolysis.

U.S. Pat. No. 5,531,934 to Freeman et al. (1996) discloses the thermal synthesis of polysuccinimide catalyzed by phosphoric acid and copolymers of succinimide and other amino acids such as tyrosine, histidine, phenylalanine, and leucine in the presence of polyphosphoric acid. The copolymers were prepared with a reactant molar ratio of 4:1 aspartic acid:comonomer amino acid. The resulting polysuccinimides and copolymers of succinimide were converted to the aspartate forms by mild alkaline hydrolysis. The materials were exemplified as useful, particularly in conjunction with pyrophosphate, as inhibitors of corrosion of ferrous metals.

U.S. Pat. No. 5,536,813 to Charpenel and Lepage (1996) discloses the thermal synthesis of linear biodegradable polysuccinimides in the presence of boric acid and related boron compounds. Included was an interpretation of proton NMR data to show possible production of branched polysuccinimides by dry, thermal, uncatalyzed synthesis from aspartic acid, including improved biodegradability of the linear, boric-acid synthesized materials. The polysuccinimides were converted to polyaspartates by mild alkaline hydrolysis. The materials, which included copolymers of aspartic acid and other amino acids, were indicated for use in detergents. The materials were described as low-in-color to virtually white, but a bleaching step was also described for improving the color of the products. In addition, although condensation reactions were described at 30° to 50° C., synthesis temperatures were at 130° to 300° C.

U.S. Pat. No. 5,543,490 to Groth et al. (1996) describes the synthesis of maleamic acid by reaction of maleic anhydride and ammonia in a solvent such as toluene at 60° to 70° C. for up to about 2 hours. Next, the purified maleamic acid was thermally polymerized to polysuccinimide at about 185° C. for about 5 minutes, although higher temperatures and longer times were also described. The polysuccinimide was subjected to mild alkaline hydrolysis to produce polyaspartate. Activities relative to corrosion inhibition, antimicrobial action, and dispersancy were shown.

U.S. Pat. No. 5,548,036 (1996) to Kroner et al. discloses the preparation of polysuccinimide and copolymers of succinimide and aspartic acid by thermal polymerization of maleic anhydride and ammonia. At temperatures less than 150° C., the aspartic acid content of the polymer is favored. At temperatures greater than 190° C., the succinimide content approaches 100%. Production of the aspartate-containing form of the polymer was favored by polymerization in the presence of alkalizing agents such as sodium carbonate. In addition, sodium polyaspartate without formation of polysuccinimide was accomplished by thermal polymerization of sodium salt of maleamic acid at 200° C. for 2 hours. The materials were described as useful in detergents, as dispersants, as cement additives, and as antiscalants.

U.S. Pat. No. 5,552,516 to Ross et al. (1996) discloses higher molecular weight polysuccinimides prepared by linking lower molecular weight polysuccinimides with diamines or polyamines in an organic solvent. The crosslinked polysuccinimides were alkaline hydrolyzed to aqueous-soluble, crosslinked polyaspartates. The examples included polyaspartate materials of molecular weights up to 78,000, as measured by gel permeation with linear, lower-molecular-weight polyacrylates as standards. The probability that the nonlinear polyaspartates would have a lower molecular weight by gel permeation than a linear molecule of equivalent, actual molecular weight was discussed.

U.S. Pat. No. 5,552,517 to Martin (1996) teaches the thermal polymerization of aspartic acid in alkyl alcohols or preferably alkanes such as dodecane in the presence of phosphoric acid. Reaction temperatures were exemplified from 160 to 220° C. and disclosed to 260° C. for about 1 to 2 hours. Low-color, relatively high MW polysuccinimides were produced (GPC MW up to 17,640), which were alkaline hydrolyzed to yield polyaspartates. Colorless or low-color polyaspartates and polysuccinimides were described as desirable for detergent applications.

U.S. Pat. No. 5,594,077 to Groth et al. (1997) teaches principally the thermal polymerization of maleic anhydride and ammonia to form polysuccinimide but also includes concepts and practices such as using the heat of formation of reaction intermediates for adiabatic formation of polymer precursors and oligopolymers in a first stage. This includes mixing dynamics in the same timeframe or faster than the rate of formation of reaction intermediates. This was said to minimize undesirable reactions between reactants and reaction products or byproducts. Thus, the reactants were mixed via a jet-mixer assembly within about 2 seconds and reacted in the first stage for less than 60 seconds at about 185° C. The materials were pumped into a second-stage vessel such as a multiphase spiral tube reactor for further heating at about 170 to 175° C. for 10 minutes. Polysuccinimides were produced and transferred, if desired, to a tank at 60° C., pH-stat at 9.5 with aqueous NaOH for production of polyaspartates of MW around 3000. Numerous modifications and copolymerizations were discussed, and some exemplified. For example, labile compounds such as urea were described as sources of ammonia. In addition, comonomers such as acrylic acid, glutamic acid, citric acid, amino sulphonic acids, alcohols, fatty acids, and saccharides were discussed. The use of organic solvents as reaction media was also disclosed. Reference was made to spectroscopic data that indicated some level of ester linkages of maleic residues in the products as well as C—C linkages between maleic or fumaric residues. Molar excesses of $NH_3$ to monomer reactant as high as 25:1 were mentioned, resulting in production of asparagine-containing polymers. Use of the materials in detergents was emphasized along with applications that included water-treatment, dispersancy, and additives for prevention of encrustations in concentrating sugar juice.

The occurrence of the polysuccinimide in the pathway to polyaspartate does afford the opportunity for formation of derivatives via nucleophilic addition to the imide rings. In addition, in some fields of use, the succinimide-containing polymer itself can be used directly without further treatment. However, most fields of use, including the ones with the largest amounts of annual use of polymers at present, call for conversion of the polysuccinimide and succinimide-containing copolymers to the polyaspartate forms. This necessitates extra steps and expense. Thus, it would be useful to be able to make polyaspartate and its derivatives directly, without having to subject the intermediate materials to the ring-opening, mild alkaline hydrolysis to produce the desired product with polycarboxylate character. It would also be useful to work directly with aspartic acid or aspartate as starting monomer rather than with maleic anhydride, ammonia, and related reactants.

SUMMARY OF THE INVENTION

Accordingly, it is one object of the present invention to provide novel polyaspartate molecules.

It is another object of the present invention to provide a novel method for preparing polyaspartate.

It is another object of the present invention to provide novel polymers containing aspartate monomers and other comonomers such as phosphated, phosphonated, sulfated, sulfonated, and hydrophobized monomers.

It is another object of the present invention to provide a novel method for preparing such copolymers.

It is another object of the present invention to provide novel higher molecular weight copolymers of principally aspartate, diamine, and polyamine comonomers.

It is another object of the present invention to provide a novel method for preparing such copolymers.

It is another object of the present invention to provide novel higher molecular weight copolymers of aspartate and other comonomers such as phosphated, phosphonated, sulfated, sulfonated, and hydrophobic monomers along with diamine and polyamine compounds.

It is another object of the present invention to provide novel methods of using the polymers of the present invention as antiscalants, corrosion inhibitors, dispersants, detergent builders, detergent antiredeposition agents, detergent surfactants, chelants, agricultural growth enhancers, fertilizers, microbiocides, fungicides, cosmetic additives, additives to shampoo and other hair products, tartar control agents, ion-exchange resins, chromatographic materials, food additives, and juice processing agents.

These and other objects of the present invention, which will become apparent during the following detailed description, have been achieved by the inventor's discovery that the thermal polymerization of a salt of aspartic acid produces polyaspartate without formation of polysuccinimide.

The inventor has further discovered that comonomers such as aminoethylsulfonate and aminoethylphosphonate can be admixed with the salt of aspartic acid and copolymerized to form a copolymer which exhibits improved activity for uses such as inhibitors of crystallization. The comonomers can also be advantageously codissolved with the salt of aspartic acid dried to form a salt of the comonomers, and then polymerized to form a copolymer with yet greater activity for uses such as inhibitors of crystallization.

Advantageously, a preformed polyaspartate can be admixed with the comonomers, or preferably codissolved then dried to form a salt, then polymerized to form a copolymer with still greater activity for uses such as inhibitors of crystallization and other related uses such as dispersancy. The preformed polyaspartate can be synthesized by any known method, including the step of alkaline hydrolysis of the polysuccinimide intermediate.

The inventor has also discovered that by polymerizing the salt of aspartic acid and aspartic acid as comonomers, it is possible to produce a copolymer of aspartate and succinimide. This result may be achieved by preparing solutions of aspartate, aspartic acid, or both monomers by adjusting the pH to a value of from 1 to 6, then drying to form a salt. Some of the mixed aspartate-succinimide copolymers, particularly the ones prepared in the range of pH 4 to 5, are water-soluble. These copolymers can be derivatized in aqueous solution by nucleophilic addition of comonomers such as aminoethylsulfonate to produce useful copolymers without the need for an organic solvent as a medium for the reaction and without the occurrence of residual imide residues.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1A:
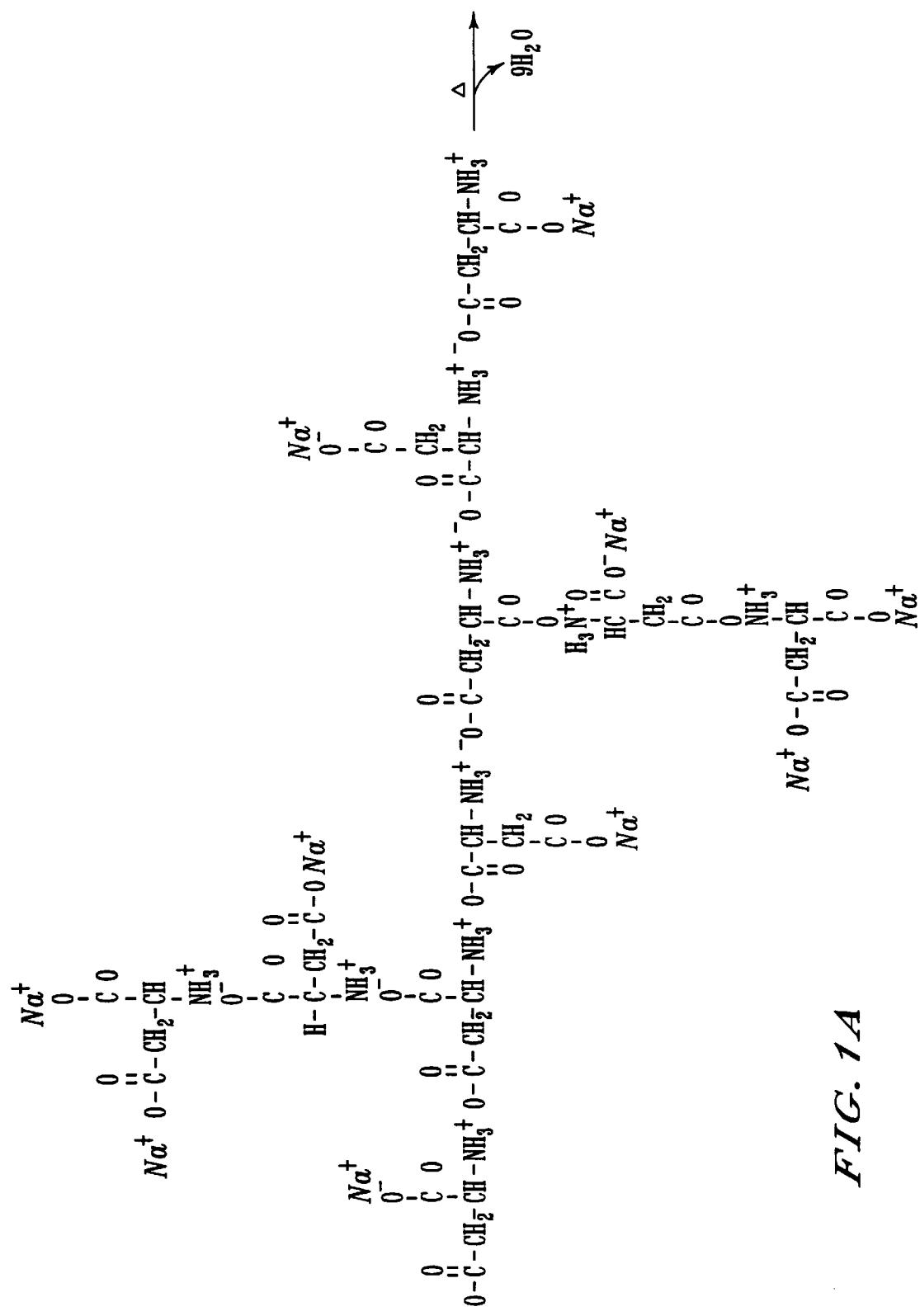
FIG. 1 illustrates the possible arrangement of ten residues of sodium aspartate on drying from solution, followed by thermal polymerization to form branched, α, β, D, L, sodium polyaspartate.

Thus, in a first embodiment, the present invention provides a novel method for preparing polyaspartate and copolymers which contain monomers derived from aspartate. The present method is characterized by the use of a salt of aspartic acid for at least a portion of the aspartic acid which is to be incorporated into the polymer.

The salts of aspartic acid which can be used in the present method include: the monosodium salt of aspartic acid, the monopotassium salt of aspartic acid, hemimagnesium aspartate, disodium aspartate, and magnesium aspartate, as well as other cationic counterions in combination with aspartate monomer. The use of the monosodium salt of aspartic acid is preferred. Monoammonium aspartate may be used but affords polymers of lower molecular weight.

When preparing a homopolymer of aspartate, the polymerization can be carried out by thermal polymerization of the salt of aspartic acid. Although the exact time and temperature of the thermal polymerization will depend on the identity of the salt being polymerized, the thermal polymerization is suitably carried out at a temperature of 140 to 350° C., preferably 160 to 280° C., more preferably 200 to 240° C., for a time of 1 minute to 72 hours, preferably 1 to 24 hours, more preferably 2 to 8 hours. In the case of the monosodium salt of aspartic acid, good results have been achieved by carrying out the thermal polymerization at a temperature of about 220° C. for a time of about 8 hours.

Of course, the thermal polymerization may be carried out by polymerizing a mixture of two or more salts of aspartic acid. The salt used in the polymerization may be anhydrous or may be a hydrate, such as monosodium aspartate monohydrate. Although a Lewis acid such as stannous chloride may be included in the thermal polymerization, this addition does not appear to give rise to any noticeable improvement.

The salt of aspartic acid may be prepared by neutralizing aspartic acid with the appropriate base. For example, the monosodium salt can be formed by titrating free aspartic acid with a stoichiometric amount of NaOH in aqueous solution. Typically, an aqueous solution which is 0.1 to 2.5 M, preferably 0.5 to 1.0 M, in aspartic acid is titrated with a 0.1 to 15 M, preferably 5 to 10 M, aqueous solution of NaOH to a pH of 7. The aqueous solution may then be lyophilized to afford the monosodium salt of aspartic acid. Alternatively, dry or aqueous aspartic acid may be added to an aqueous solution of NaOH, followed by lyophilization.

Figure 3:
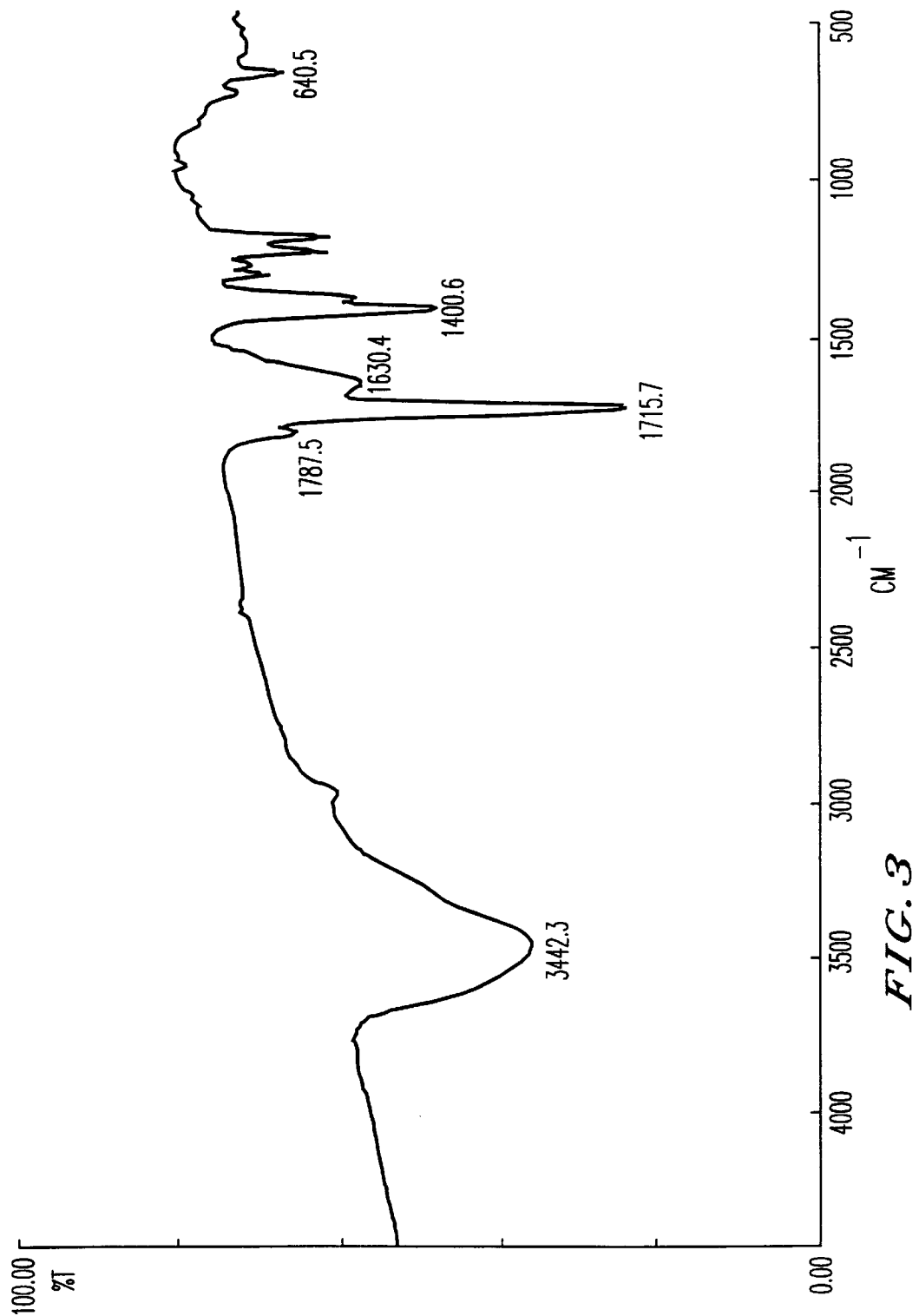
FIG. 3 is the infrared spectrum of polysuccinimide (1 μg/mg KBr) which exhibits a prominent, characteristic imide peak at ~1716 $cm^{-1}$. Aspartic acid was polymerized at 240° C. for 8 hours to produce polysuccinimide of ~3,000 Daltons, with some degree of ring-open or branched structure, as evidenced by some amide signal at 1630 $cm^{-1}$ and free carboxylic signal at 1400 $cm^{-1}$.
Figure 4:
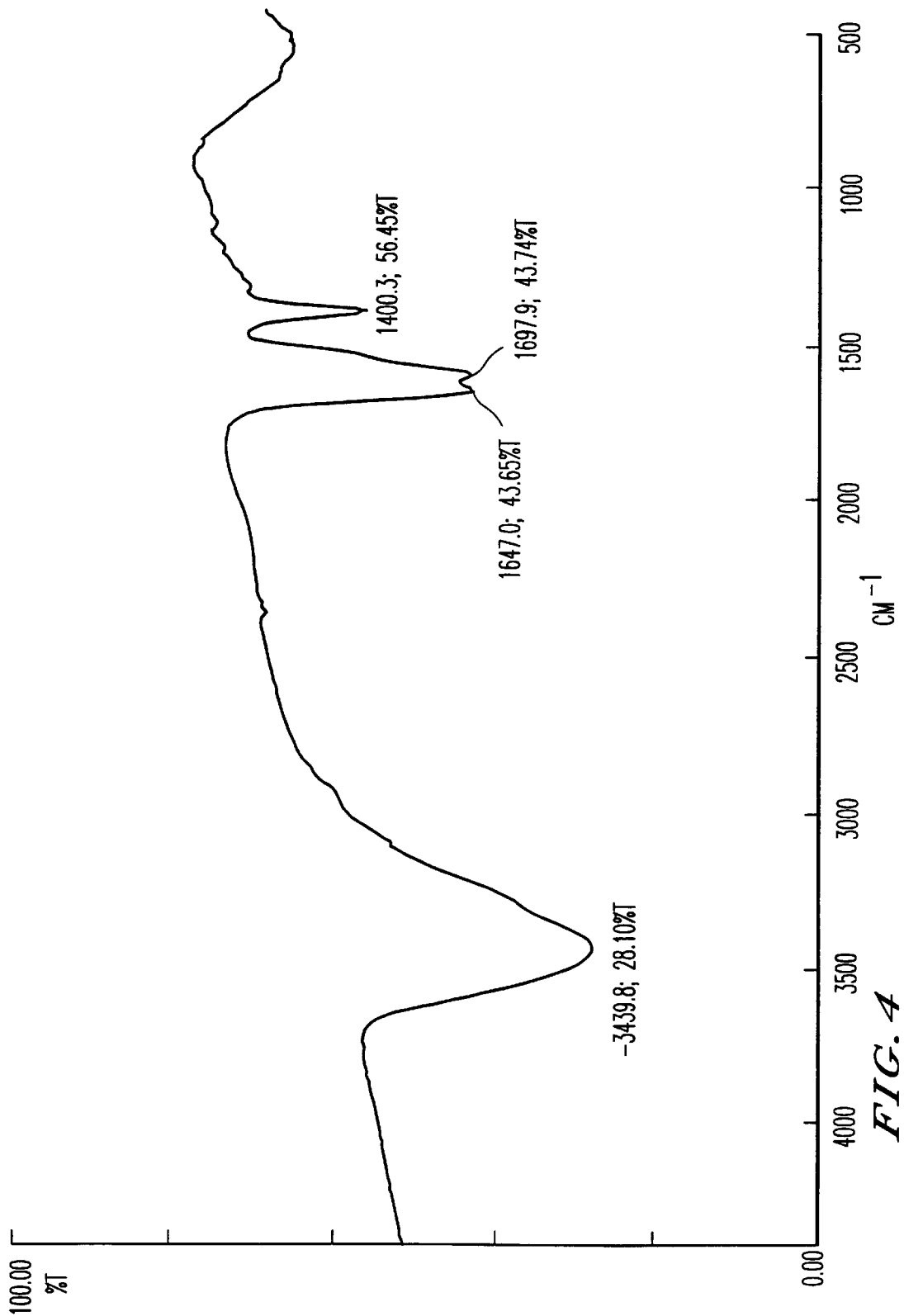
FIG. 4 is the infrared spectrum of polyaspartate (1 μg/mg KBr) that was prepared by base hydrolysis of the polysuccinimide of FIG. 4. The polyaspartate was 11% by weight Na$^+$. The characteristic amide doublet at ~1600 and 1650 cm$^{-1}$ is shown, along with the carboxylate signal at 1400 cm$^{-1}$.
Figure 5:
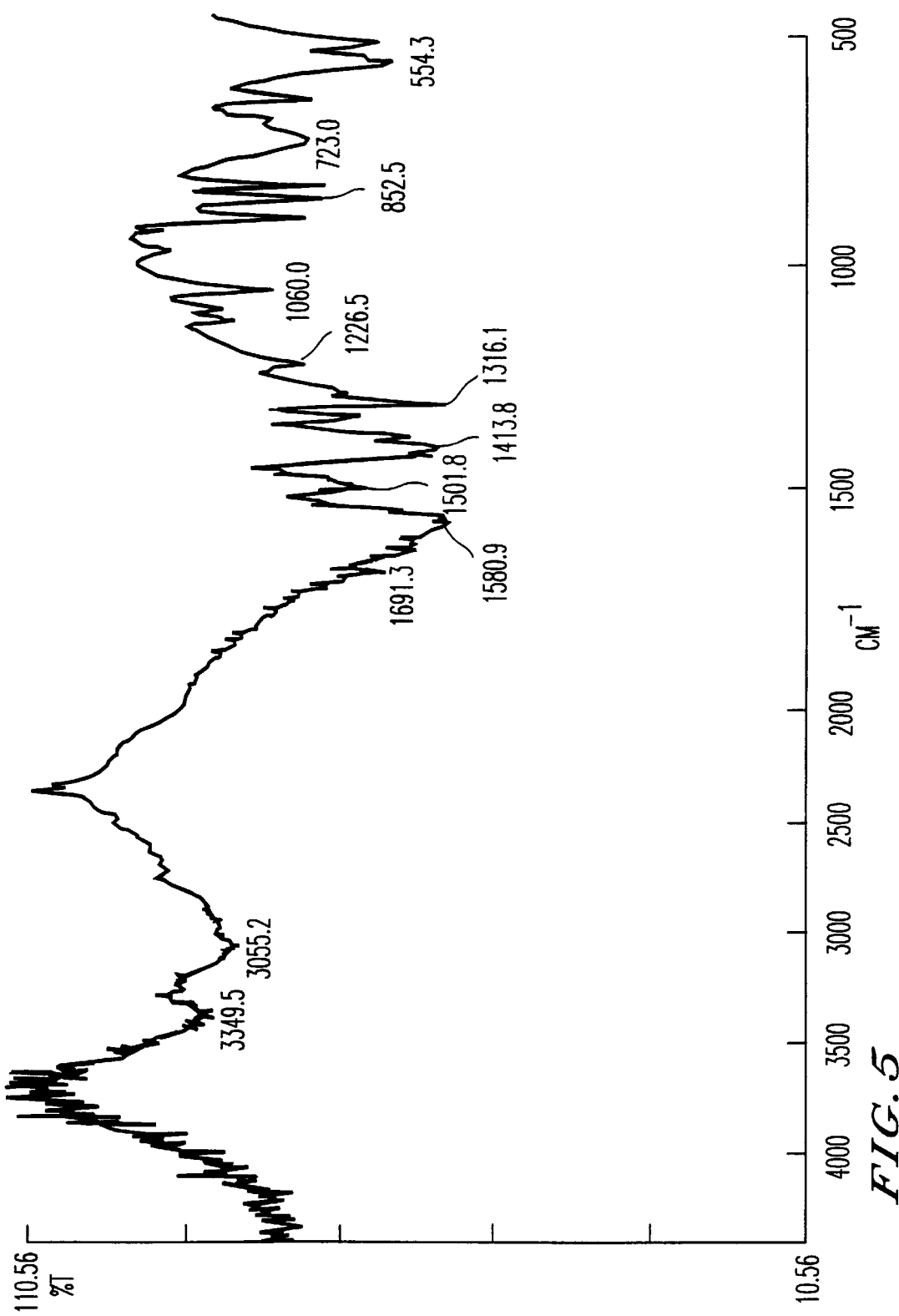
FIG. 5 is the infrared spectrum of monosodium aspartate, monomer, 2 μg/mg KBr.
Figure 6:
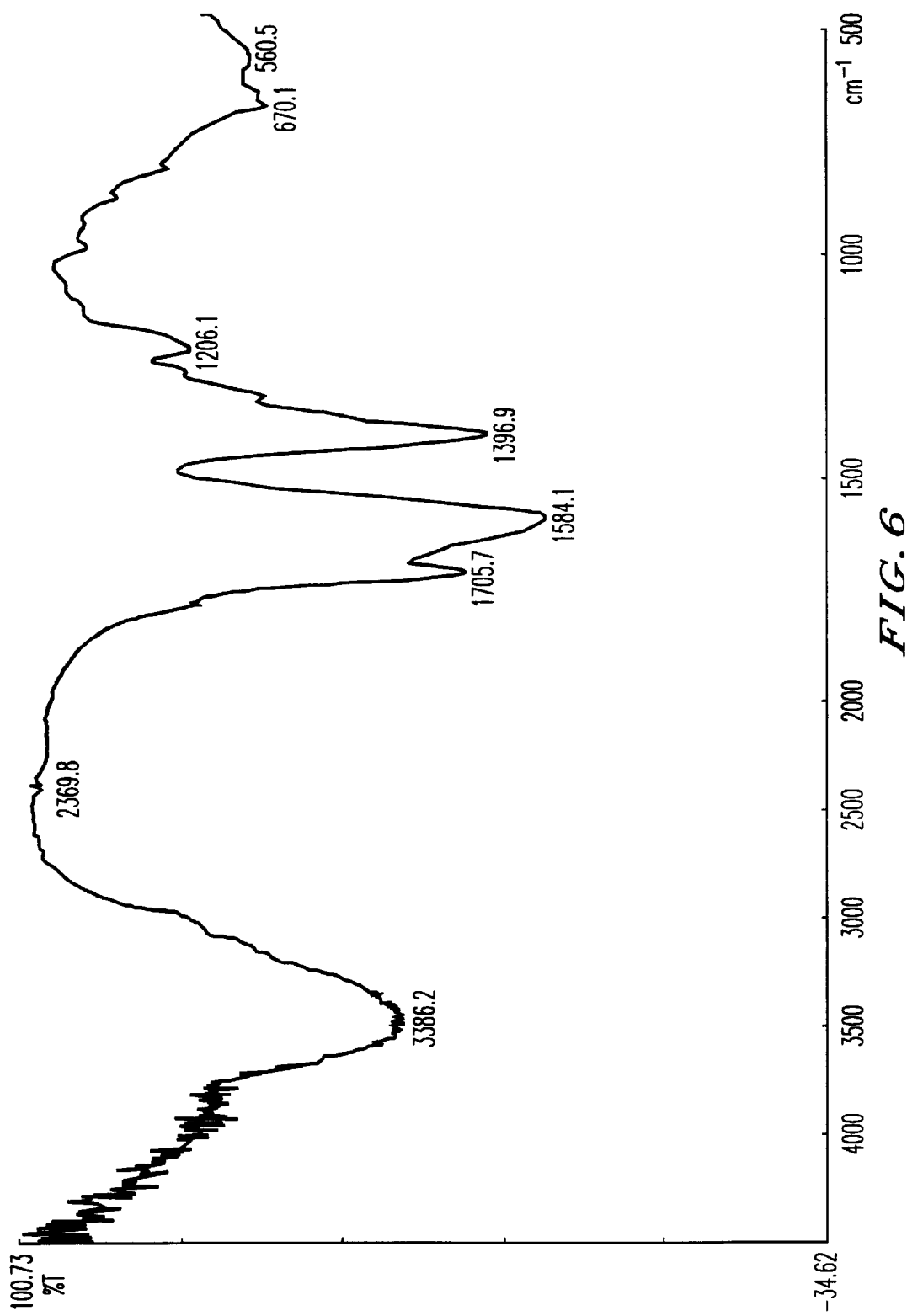
FIG. 6 is a representative infrared spectrum of sodium polyaspartate (2 μg/mg KBr) that was prepared by thermal polymerization of monosodium aspartate for 12 hours at 220° C. with a vacuum of 28 inches of Hg. The amide signal is prominent at ~1580 cm$^{-1}$. Also seen is the carboxylate signal at ~1400 cm$^{-1}$.
Figure 7:
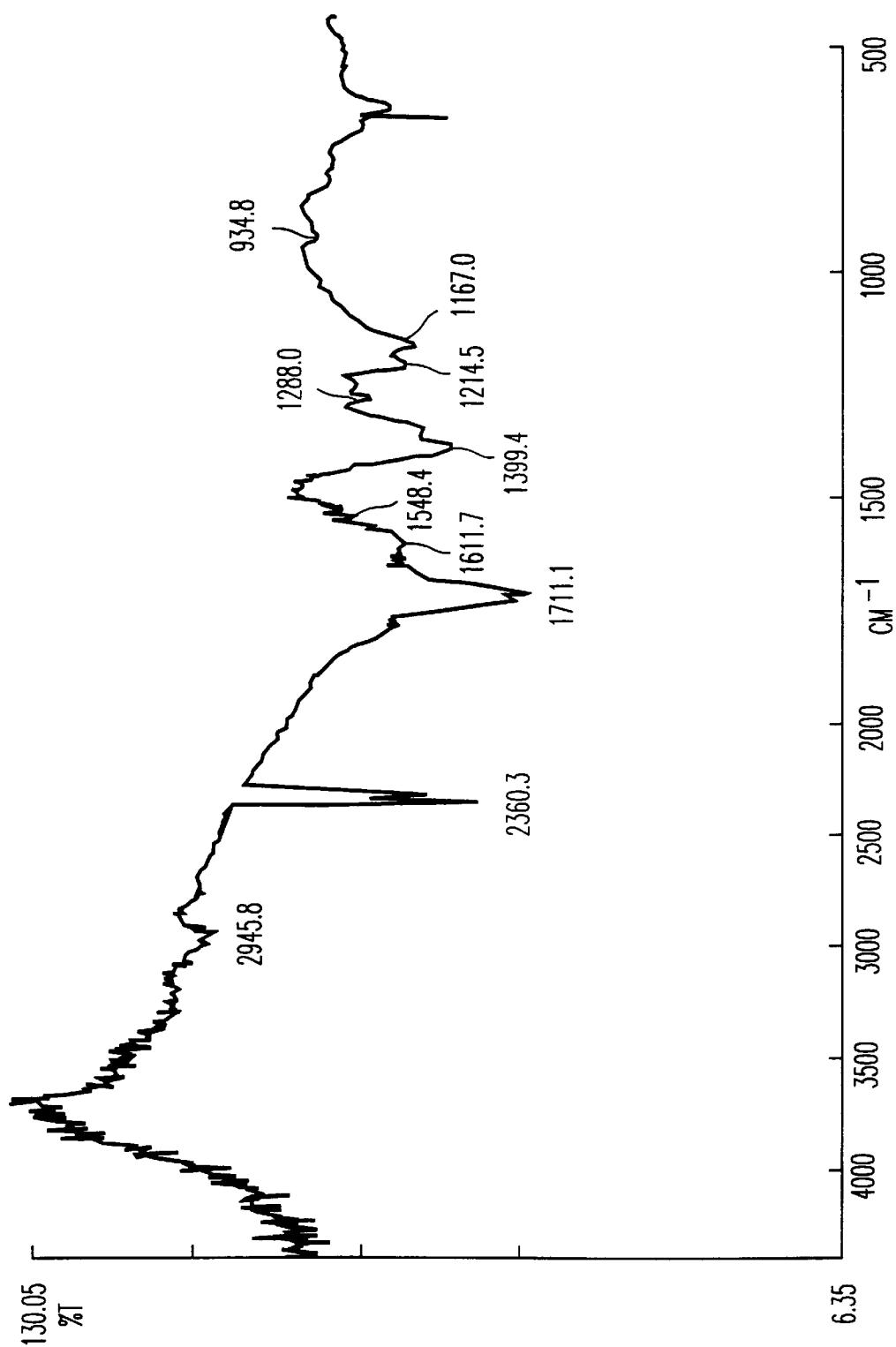
FIG. 7 is a representative infrared spectrum of a mixed polymer (2 μg/mg KBr) of succinimide and aspartate that was prepared by thermal polymerization of L-aspartic acid that was dried from a slurry at pH 4 as in example 11. The imide peak at ~1715 cm$^{-1}$ was reduced, with development of amide signal in the region of 1600 cm$^{-1}$, as well as carboxylic/carboxylate signals of ~1400 cm$^{-1}$. See also the titration data of carboxylate groups as shown in Table 3.
Figure 8:
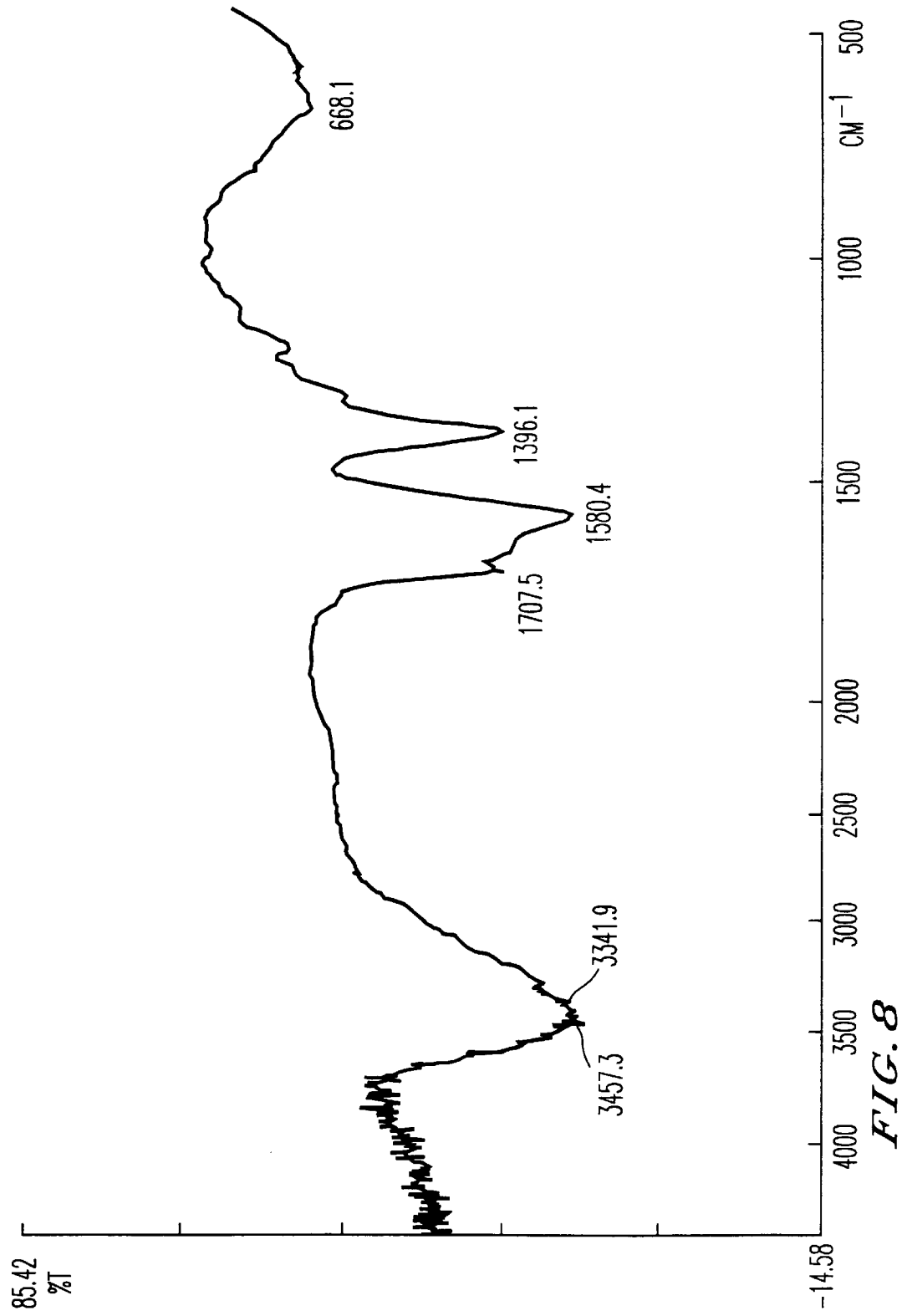
FIG. 8 is a representative infrared spectrum of a mixed polymer (2 μg/mg KBr) of succinimide and aspartate that was prepared by thermal polymerization of L-aspartic acid that was dried from a slurry at pH 5 as in example 12. Under these reaction conditions the imide peak was greatly reduced relative to the amide signals in the region of 1580 cm$^{-1}$, although some imide groups remained (see also the titration data of Table 3)
Figure 9:
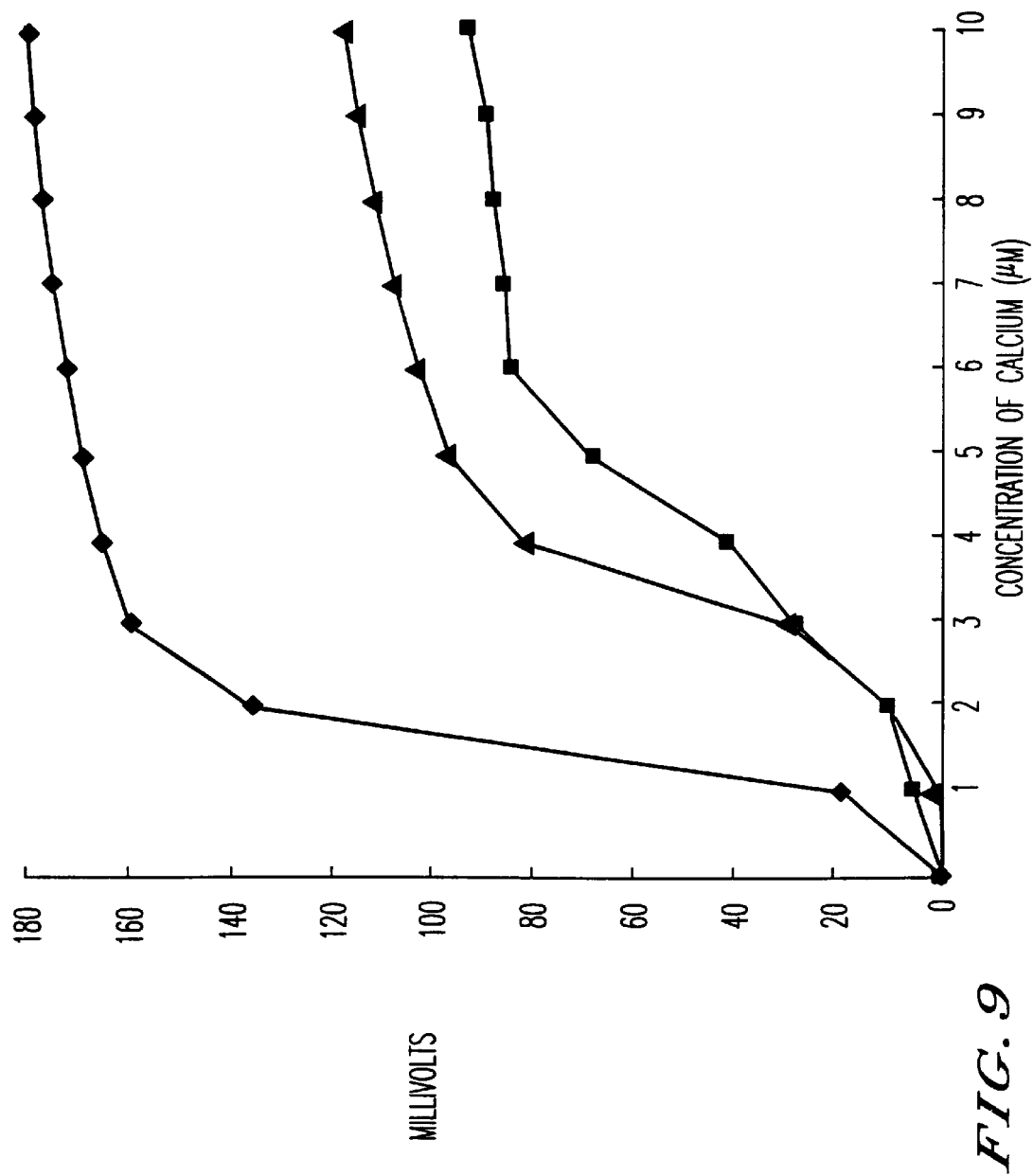
FIG. 9 is a representative titration curve of a polyaspartate of the present invention showing calcium-binding as measured by calcium electrode. KPAsp=polyaspartate made by polymerization of monopotassium aspartate at 220° C. for 8 hours. EDTA=ethylene diamine tetracetate.

As shown in the Examples presented below, polymerization of the salt of aspartic acid according to the present method affords a polyaspartate molecule which is imide-free. By the term "imide-free" it is meant that no imide peak or only a small imide peak is detected by infrared spectroscopy, or that fewer than 10%, preferably fewer than 1%, of the monomer units contained in the polymer contain the succinimide group. Typically, the infrared absorption spectrum of the "imide free" polyaspartate produced by the present method will exhibit an imide peak (at 1710 to 1720 cm$^{-1}$) which has an integrated intensity which is less than 10%, preferably less than 5%, of the integrated intensity of the amide doublet peaks at ~1600 and ~1650 cm$^{-1}$ for the same polymer (see FIGS. 3 and 4).

The imide-free polyaspartates of the present invention are believed to be structurally distinct from polyaspartates made by other known methods based on their distinctive infrared spectra as well as on mechanistic considerations. For example, the methods of synthesis of the prior art operate either in an acidic environment of aspartic acid alone, or with acid catalysts such as H$_3$PO$_4$, or in the presence of ammonia or ammonium compounds that generate ammonia on heating. In each case, imide formation occurs spontaneously during polymer formation as the free carboxyl groups of the side chain, or the ammonium carboxyl group of the side chain, form condensation bonds with the secondary amines of the polymer backbone. Indeed, the imide formation has been cited as part of the mechanism of chain extension as the free amine of an incoming monomer aspartic acid is attached by nucleophilic addition. The rapid imide formation, which may be essentially instantaneous in the presence of acid catalysts, leads to fundamentally linear polymers, with less than 10% of residues perhaps forming branch points in dry thermal polymerization of aspartic acid, and with essentially branchless polymers produced under optimal conditions of acid catalysis. The conventional thermal polymerization of aspartic acid to obtain polysuccinimide followed by conventional base hydrolysis to α, β-aspartate may be represented as follows:

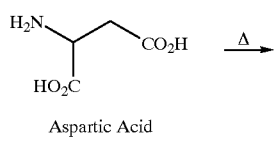

Aspartic Acid

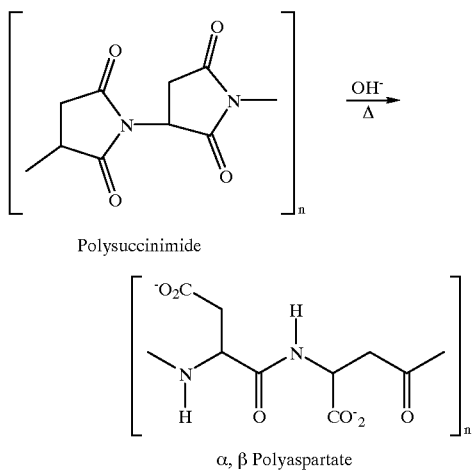

Polysuccinimide

α, β Polyaspartate

On the other hand, the imide-free polymerization of the present invention may be based on the fact that the presence of a sodium cation as part of an ionic bond with an anionic carboxylic group renders the carboxylic group unavailable for condensation reactions for both incorporation into the polymers and imide formation subsequent to incorporation. Conversely, the presence of a cationic amine group in the monomer as counterion to the anionic carboxylic group does not render the carboxylic group unreactive, but permits amide formation. Similarly, the cationic amine group of the monomer when adjacent to an acidic, nonionic carboxylic group of an aspartate monomer is also a reactive configuration, leading to amide formation on heating.

In the present process, the sodium cations and cationic amine groups compete to form ionic interactions with the anionic carboxylic groups. In some cases, amine groups would outcompete sodium for positions adjacent to both the anionic carboxylic group and the neutral, acidic carboxylic group of a residue, forming a branch point. The excess sodium could be balanced by formation on drying of non-reactive solid NaOH.

Figure 1B:
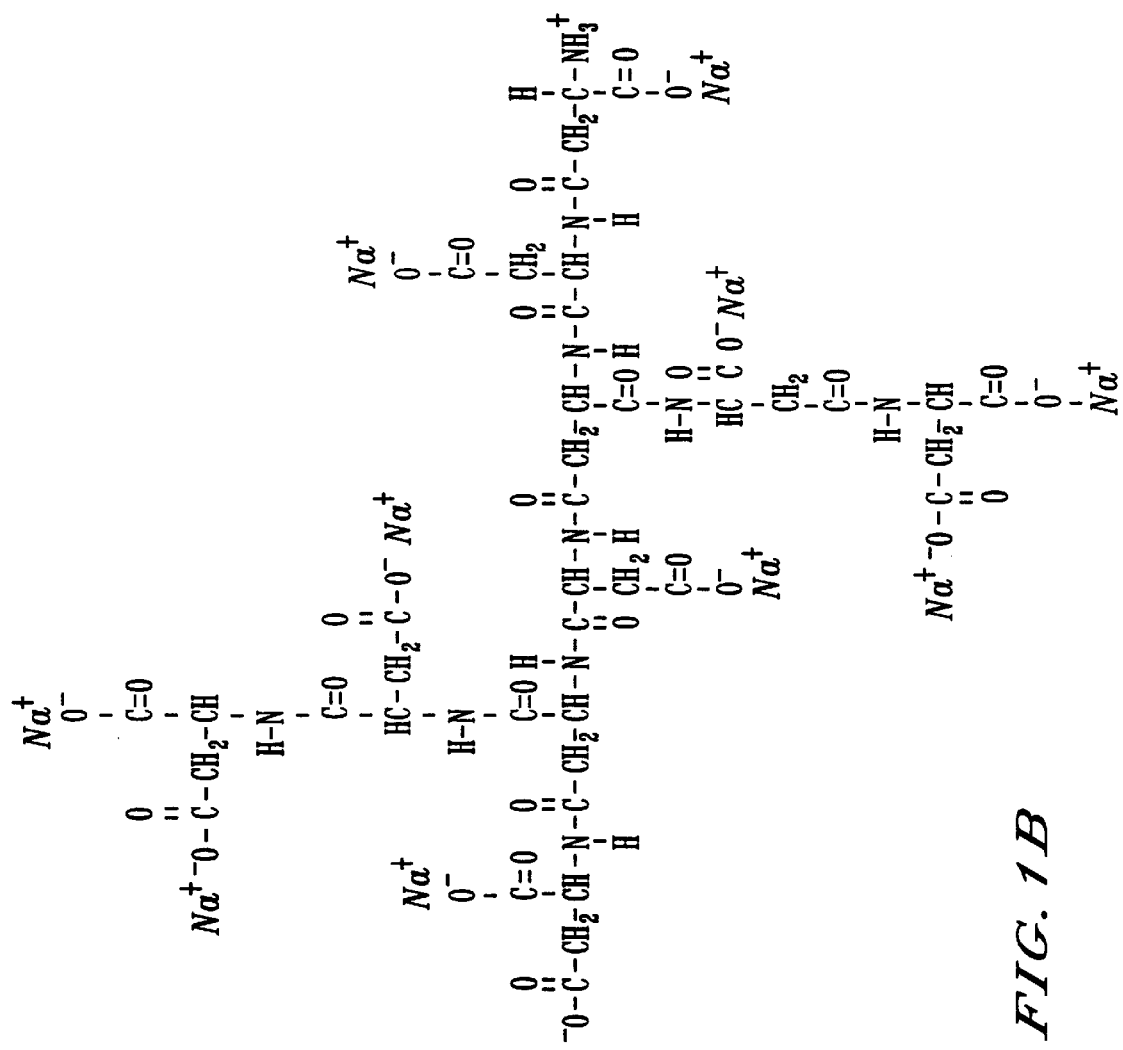
Figure 2:
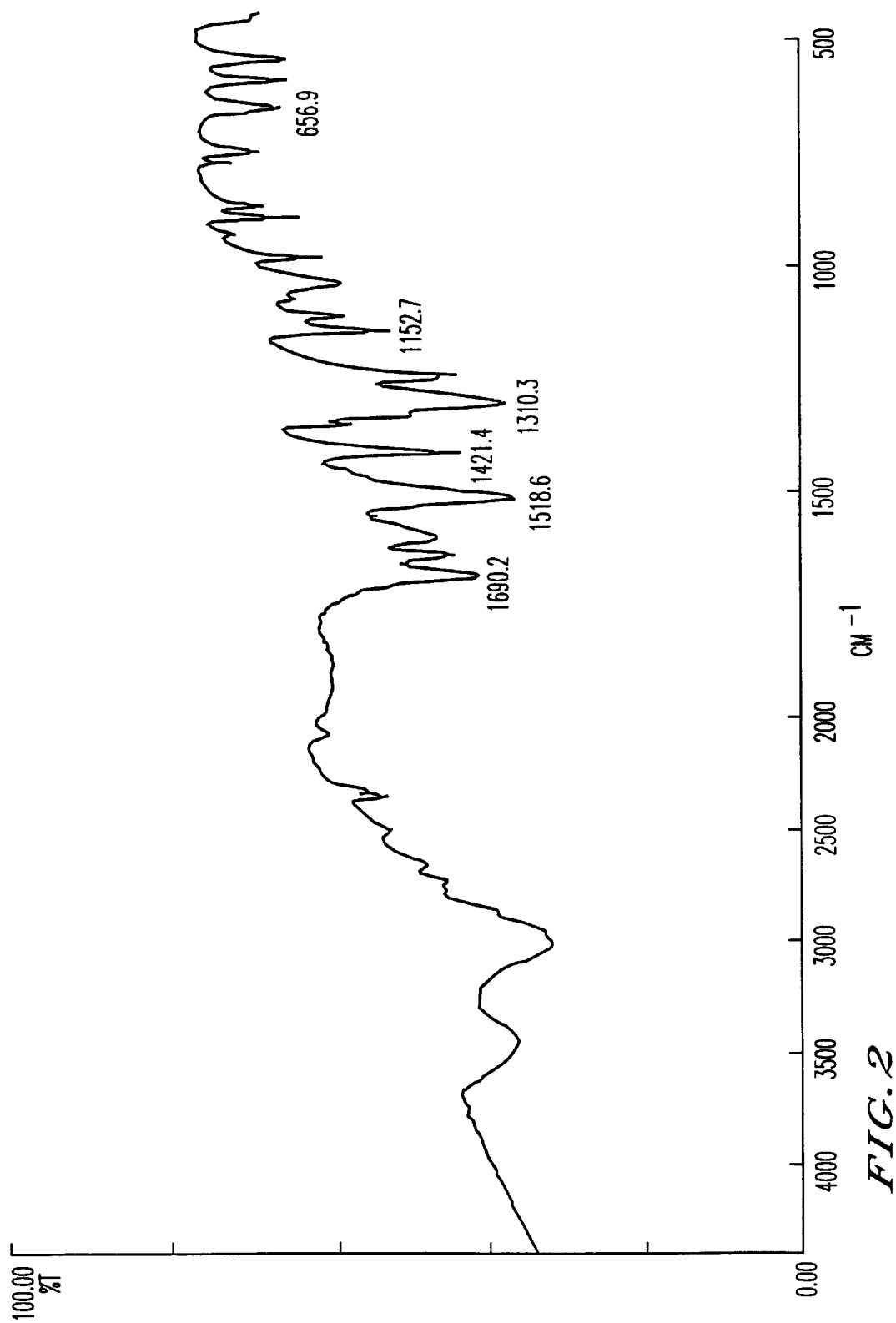
FIG. 2 is the infrared spectrum of L-aspartic acid, monomer, 1 μg/mg KBr.

One possible arrangement of ten residues prior to condensation is shown in FIG. 1. All of the carboxyl groups are drawn in the anionic form, although, strictly speaking, half of them would be nonionic. Titration data (Kokufuta, E. S., et al., Biosystems, vol. 9, pp. 211–214 (1977); Saudek, V., Biopolymers, vol. 20, pp. 1625–1633 (1981); Windholz, M., et al., The Merck Index, 10th Edition. Merck and Company, Rahway, N.J., p. 121 (1983); and Weast, R. C., et al., CRC Handbook of Chemistry and Physics, CRC Press, Boca Raton, Fla., p. C-699 (1987)) show that the α-carboxyl group ionizes first (pK~2.1), with the β-carboxyl group significantly less acidic (pK~3.9). Therefore, the monosodium aspartate monomer would be largely ionized and blocked at the α-carboxyl group, with the β-carboxyl group mostly available for amide formation. This would generate polyaspartates that are mostly β-linked.

Typically, the polyaspartate produced by the present process has a gel permeation molecular weight of 300 to 5,000 daltons. In a preferred embodiment, the polyaspartate of the present invention has a gel permeation molecular weight of 500 to 3,000 daltons.

The molecular weight of the polyaspartate may be increased by including a polyamine (including diamines) in the thermal polymerization of the salt of aspartic acid. Suitable diamines and polyamines include aliphatic diamines, arylaliphatic diamines, as well as triamino, tetramino, and polyamino compounds, such as polyoxyalkylene triamine, polyoxyalkylene diamine, triethylene tetraamine, and tetraethylene pentamine. Such polyoxyalkyleneamines are available as JEFFAMINES from Huntsman Specialty Chemicals (formerly Texaco) and as STARBURST dendrimers from Dendritech, Inc. The JEFFAMINES typically contain ethylene and/or propylene oxide units and have molecular weights ranging from 600 to 5,000. Preferred polyamines are diaminopropane, diaminobutane, diaminopentane, diaminohexane, diaminoheptane, diaminooctane, ornithine, ornithine methyl ester, lysine, lysine methyl ester, spermine, and spermidine. Particularly preferred diamines include diaminobutane, diaminopropane, diaminohexane, and lysine methyl ester.

Typically, the polyamine is incorporated in a monomer mixture of polyamine and monosodium aspartate in an amount of 1 to 50 mole %, preferably 5 to 15 mole %, based on the total moles polyamine and salt of aspartic acid in of the monomer mixture. By including a polyamine in the monomer mixture it is possible to increase the molecular weight of the resulting polyaspartate to 100,000 daltons and higher as measured by gel permeation.

In another embodiment, the present method may be carried out by polymerizing the salt of aspartic acid in the presence of a preformed polyaspartate. The preformed polyaspartate may be that prepared by the present process or that prepared by the conventional polymerization of aspartic acid followed by hydrolysis. Typically, the preformed polyaspartate will have a gel permeation molecular weight of 1,000 to 100,000, preferably 2,000 to 30,000 daltons. The preformed polyaspartate is usually included in the polymerization in an amount of 25 to 95 mole %, preferably 50 to 90 mole %, based on the total moles of residues (monomer units) of the preformed polyaspartate and the salt of aspartic acid.

Upon further thermal condensation in the presence of an introduced comonomer, the preformed sodium polyaspartate remains in the ionized form, being blocked from imide formation. Thus, the resulting copolymer may be dried and used directly, without the need for alkaline hydrolysis.

For example, as shown in the experiments below, copolymers of polyaspartate and aminoethylphosphonate or aminoethylsulfonate can be prepared by this approach. These copolymers are very effective inhibitors of crystallization. This approach permits selection of the molecular weight, and often an accompanying improvement in activity, of the copolymer, by first selecting the molecular weight of the polyaspartate.

In another embodiment, the present process may be carried out by thermally polymerizing a monomer mixture of aspartic acid and a salt of aspartic acid, to obtain a polymer which contains both amide and imide groups. For convenience, such copolymers of succinimide and aspartate are referred to hereinafter as mixed amide/imide copolymers. Such amide/imide copolymers will contain monomer units of both the α and β amide type and the imide type which are shown below:

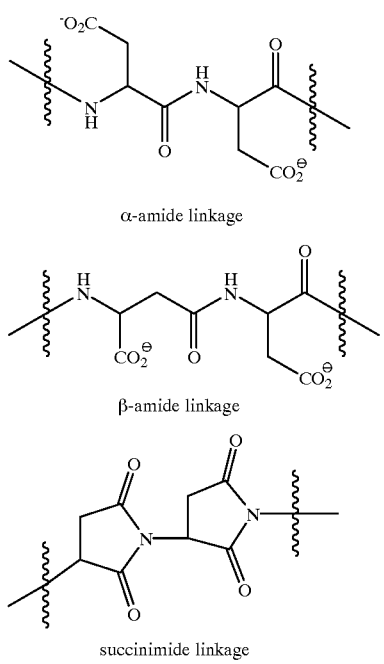

α-amide linkage

β-amide linkage succinimide linkage

The relative number of amide versus imide linkages present in the copolymer is related to the relative proportions of aspartic acid and salt of aspartic acid used in the monomer mixture. Typically, the monomer mixture will contain 5 to 95 mole %, preferably 10 to 50 mole %, of aspartic acid, based on the total moles of the monomer mixture; and 5 to 95 mole %, preferably 50 to 90 mole %, of the salt of aspartic acid based on the total moles of the monomer mixture.

The monomer mixture of aspartic acid and salt of aspartic acid may be prepared by dry mixing aspartic acid and the salt of aspartic acid or by drying (e.g., lyophilizing) a solution or suspension of aspartic acid and salt of aspartic acid. The solution or suspension of aspartic acid and the salt of aspartic acid may be prepared by titrating an aqueous solution or suspension of aspartic acid with NaOH in a substoichiometric amount, yielding a pH that is intermediate between fully neutral and fully ionized carboxylic groups of the monomer. Dried powders that are prepared from solutions of ~pH 1 or less (titrated with HCl) are expected to have carboxylic groups essentially completely in the nonionized, COOH form, with the amine groups as $NH_3^+$ $Cl^-$. Excess HCl would be lost to the atmosphere on drying. Dried powders that are prepared from solutions of ~pH 5 or higher (titrated with NaOH) are expected to have carboxylic groups that are essentially completely in the ionized $COO^-$ form, with either $Na^+$ or $NH_3^+$ of aspartate as the counterion. Excess $Na^+$ would form NaOH on drying.

Upon heating at 220° C. for 8 hours, the carboxylate groups will form amide bonds if associated with an amine or remain free as $COO^-Na^+$. The acidic, nonionized carboxylic groups will form amide bonds if associated with an amine, and once incorporated, pendant COOH groups will immediately form an imide with the secondary amine of the polymer backbone. The product in such case will be a mixed amide/imide polymer of succinimide and aspartate, as exemplified in several experiments as detailed below.

Substoichiometric, mild, alkaline hydrolysis of polysuccinimide with enough NaOH at 80° C. to partially convert the material to a copolymer of aspartate and succinimide in water was also attempted. However, this approach yielded a mixture of either ring-opened molecules of polyaspartate in the soluble phase or nonhydrolyzed polysuccinimide as insoluble residue. Little or no copolymer of aspartate and succinimide was produced. Similar results were also reported by Wolk et al. (Wolk, S. K., et al, *Macromolecules*, vol. 27, pp. 7613–7620 (1994)) who suggested that once the polysuccinimide molecule begins to interact with water as aspartate residues appear during the hydrolysis, the hydrolysis quickly goes to completion of that polymer molecule, leaving the bulk of the insoluble particle of polysuccinimide in that form. Along these lines, a series of samples taken over time intervals of minutes during the hydrolysis also yielded a soluble fraction of essentially ring-opened polyaspartate and an insoluble fraction of polysuccinimide prior to the point of complete conversion to polyaspartate. Thus, the mixed amide/imide copolymers produced by thermally polymerizing aspartic acid and the salt of aspartic acid according to the present process are novel.

In another embodiment, the present invention provided methods for preparing polyaspartate molecules which contain pendant functional groups such as sulfonate or phosphonate. In the first method, the salt of aspartic acid is thermally polymerized in the presence of a compound which contains an amino group and a functional group such as sulfonate and phosphonate. Suitable compounds containing an amino group and a functional group include compounds such as represented by the formulae:

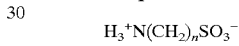

wherein n=1–6, preferably 2–6; and

wherein n is as defined above. Of course, it would also be possible to use a metal salt of such a compound.

Preferred compounds containing an amino group and a sulfonate or phosphonate group include aminoethylsulfonic acid and aminoethylphosphonic acid. Thermal polymerization of aspartic acid with a compound containing an amino group and an anionic functional group other than a carboxyl group results in the formation of a polymer which contains monomers in which a carboxyl group of aspartic acid, which has not formed an amide linkage to an amino group from an aspartate molecule, has instead formed an amide linkage with an amino group from the compound containing the amino group and the other anionic functional group. Representative structures of linkages arising from the use of aminoethylsulfonate and aminoethylphosphonate are shown below:

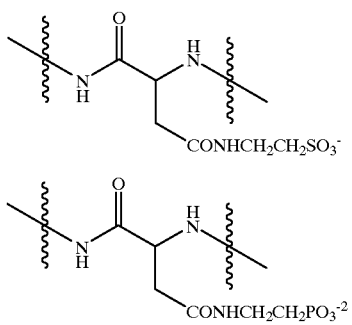

In the second method, the present mixed amide/imide copolymer is reacted with the compound containing an amino group and a functional group. Preferably this reaction is carried out in an aqueous environment. By aqueous environment it is meant aqueous solution or aqueous suspension. By aqueous it is meant water or mixtures of water with a cosolvent such as acetone, acetonitrile, dimethyl formamide, dimethyl sulfoxide, dioxane, methanol, ethanol, propanol, isopropanol, butanol, isobutanol, tetrahydrofuran, N-methyl-N-pyrrolidone, sulfolane, dimethyl acetamide, ethylene glycol dimethyl ether, 2-methoxy ethanol, methyl ethyl ketone, pyridine, ethyl acetate, ethyl ether, and propylene carbonate. If the mixed amide/imide copolymer is not completely soluble in water, a suspension of the copolymer may be used, and the polymer typically will completely dissolve as the reaction progresses. Typically, the polymer is dissolved or suspended in water in a concentration of 1 to 40% by weight, preferably, 5 to 20% by weight, and then the compound containing an amino group and a functional group is added, in an amount of to 5 to 50 mole %, preferably 10 to 40 mole %, based on the total of: (i) the moles of compound containing an amino group and a functional group; and (ii) the moles of succinimide groups in the mixed amide/imide copolymer. The reaction is carried out at a temperature of 10 to 90° C., preferably 20 to 40° C., for a time of 0.5 to 24 hours, preferably 2 to 4 hours.

As mentioned in the discussion of the background, the polysuccinimide, which is insoluble in water, can be derivatized by addition of primary amines, most favorably in organic solvents in which the polysuccinimide is soluble. If the amine is also soluble in the solvent, the reaction is further favored. However, the target amine-containing comonomer, for example, aminoethylsulfonate, may not be soluble in the organic solvent, which solvent itself may be undesirable from cost, health, and environmental standpoints.

Consequently, it can be a decided advantage to accomplish the derivatization in water. In the present invention, this was done by preparing a solution or a suspension of the mixed amide/imide copolymer in water, then adding the primary amine such as aminoethylsulfonate in the desired amount at pH ~10 to 11 at room temperature. Typically, if the mixed amide/imide copolymer had formed an insoluble or partly soluble suspension in water, it became completely solubilized during the course of the reaction. The product so formed is a copolymer of aspartate and comonomer such as aminoethylsulfonate, as exemplified in the experiments detailed below. The polymer may also contain succinimide residues, depending on the stoichiometry of the reaction, particularly if a terpolymer is the desired product.

In another preferred embodiment, the present invention provides novel polyaspartate molecules in which all or some of the pendent carboxyl groups have been converted to amide groups of the formulae:

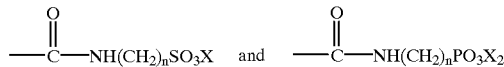

wherein n=1–6, preferably 2–6, and X is H, Na, K, or Li. In a preferred embodiment, 5 to 100 mole %, preferably 10 to 60 mole %, more preferably 30 to 50 mole % of the pendant carboxyl groups are amides of the formula

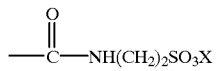

wherein X is defined above.

In another preferred embodiment, the molecular weight of the polyaspartate is increased by copolymerization of a preformed sodium polyaspartate of the present invention with a diamine compound. Suitable diamines are discussed above. Typically, the diamine and preformed sodium polyaspartate are mixed in amounts of 5 to 95 mole % (residue basis), preferably 10 to 90 mole % (residue basis). The polymerization is carried out using the same temperatures and times discussed above. In this way it is possible to convert sodium polyaspartate having a gel permeation molecular weight of, e.g., 3,000 to a polycondensate having a gel permeation molecular weight of 25,000.

In another preferred embodiment, the preformed polyaspartate of the present invention, or any preformed polyaspartate, is thermally derivitized with a comonomer or comonomers such as aminoethylphosphonate or aminoethylsulfonate to form a copolymer. The preformed polyaspartate may be in the form of a salt in which the cation is sodium, potassium, magnesium, or mixtures thereof. The same compounds containing an amino group and a functional group described above may be used for the deriviti-zation. Prior to heating to effect derivitization, the polyaspartate and derivitizing agent are codissolved in water, in relative amounts of 1 to 100 mole %, preferably 10 to 50 mole %, of the compound containing the amino group, based on the number of moles of aspartate monomer in the polyaspartate, then dried to form a salt. The derivitization may be effected by heating at the same temperatures for the same times as described above for the thermal polymerization of the salt of aspartic acid.

In another preferred embodiment, a preformed polyaspartate is hydrophobized by dry, thermal derivitization with a monoamine. The polyaspartate may be produced according to the present invention or may be any conventional polyaspartate. The cation may be sodium, potassium, magnesium or mixtures thereof. The monoamine is the same as discussed above in the context of the hydrophobization of the amide/imide copolymer. Typically, the polyaspartate and monoamine are codissolved in water in relative amounts of 1 to 100 mole % of monoamine, preferably 10 to 50 mole % of monoamine, based on the number of moles of aspartate monomer units in the polyaspartate. The solution is then dried to form a solid, and the solid is heated to the same temperatures for the same times as described in the dry, thermal polymerization of the salt of aspartic acid.

In another preferred embodiment, the present invention provides two methods for preparing hydrophobized polyaspartate derivatives. In the first method, the amide/imide copolymer prepared by the present method is reacted with a monoamine which contains a hydrophobic group. Suitable monoamines include aliphatic monoamines ($H_2NR$, where R is $C_{1-22}$ alkyl), arylaliphatic monoamines, ($H_2NR'$ where R' is $C_{6-10}$ aryl, $C_{7-15}$ alkylaryl, or $C_{7-15}$ arylaLkyl), $C_{2-4}$ alkanolamines, polyoxyalkylene monoamines, and hydrophobic amino acids. Preferred monoamines include ethanolamine, propylamine, leucine, isoleucine, valine, monoamino copolyethylene:propylene, laurylamine, and stearylamine. Particularly preferred monoamines include ethanolamine, leucine, isoleucine, valine, and laurylamine, and monoamino copolyethylene:propylene.

Typically, the monoamine is reacted with amide/imide copolymer in an amount of 5 to 50 mole %, preferably 10 to 40 mole %, based on the moles of imide groups present in said amide/imide copolymer. The reaction is typically carried out in an aqueous environment at a temperature of 10 to 90° C., preferably 20 to 40° C., for a time of 0.5 to 24 hours, preferably 2 to 8 hours.

In the second method, the polyaspartate is prepared by carrying out the polymerization of the monomer mixture comprising a salt of aspartic acid, aspartic acid itself, and a monoamine. Suitably, the monoamine and aspartic acid are present in equimolar amounts. The salt of aspartic acid is usually present in an amount of 5 to 95 mole %, preferably 10 to 30 mole %, based on the total moles of monomer. The polymerization conditions are as described above, for dry thermal polymerization of monomer mixtures of aspartic acid and a salt of aspartic acid.

The polyaspartates and copolymers of aspartate-containing polymers of the present invention may be used for any of the known uses described in the art for other polyaspartates. These include, but are not limited to, uses as dispersants, detergent additives, antiscalants, corrosion inhibitors, fertilizers, agricultural growth enhancers, chelants, cleaning agents, and others.

Other features of the invention will become apparent in the course of the following descriptions of exemplary embodiments, which are given for illustration of the invention and are not intended to be limiting thereof.

I. METHODS

1. Infrared Spectroscopy

Infrared spectra were measured by use of an FTIR spectrophotometer (Perkin Elmer, model 1600). Samples were mixed in KBr and 13 mm, disc pellets were made at 9000 lbs. for 3 minutes by use of a die (Spectratech) and press (Carver, Inc.).

2. Molecular Weight

Molecular weights (number average) were determined by gel permeation. Standards were polyaspartates made in-house by solid-phase methods ($Asp_5$ through $Asp_{60}$) and commercial polyaspartates (up to 32,000 MW; low-angle, laser light scattering, Sigma Chemical). A liquid chromatograph (Varian, model 5500) with a 7.5 mm×30 cm column (G 4000 PW, Phenomenex). The mobile phase was 0.01 M Tris, 0.1 M NaCl, pH 8.00, flow of 1 ml/min, UV detection at 235 nm.

3. Amino Acid Analysis

Amino acid composition of the polyamino acids was determined by the PICOTAG protocol (Waters). A sample of 10 µl of a 1 µg/ml stock solution of the polymer was hydrolyzed in vacuo at 150° C. for 1 hour in the presence of HCl vapor to yield amino acid monomers. These were derivatized with phenylisothiocyanate and measured by reverse-phase liquid chromatography (Spectraphysics model 8800), 3.9 mm×15 cm column (Waters Division, Millipore, Inc.), acetonitrile gradient, UV detection at 254 mm, detection limit of 10 pmoles per residue. Amino acids used for calibration included aminomethyl phosphonate, aminoethyl phosphonate, and aminoethyl sulfonate (Sigma Chemical), in addition to standard residues.

4. Phosphate Content of Asp-Phosphonate Copolymers

Measurements of phosphonated monomer by amino acid analysis and total phosphate content by inorganic chemical analysis of copolymers were compared quantitatively. Phosphorus content of the copolymers was determined by acid hydrolysis to release inorganic phosphate, followed by spectrophotometric assay of the phosphomolybdate complex (Eisenreich et al., *Environmental Letters*, vol. 9, pp. 43–53 (1975)). Copolymers were dialyzed (Spectrapor, MW cutoff of 1000) prior to analysis to insure removal of residual unreacted phosphonated monomer.

5. Acidometric Titration of COOH Groups

Samples of polyaspartic acid were titrated over the range of pH 9.5 to 3.0 with 0.1 N HCl as a measure of the amount of titratable $COO^-$ groups per unit weight of polymer. A subsample of 58 mg (0.5 millimole per residue as aspartic acid) in 50 ml of water was adjusted to pH 11.3 with 1 N NaOH, then immediately autotitrated to pH 3.0 by use of a computer-assisted titrimeter (Fisher Scientific). In the case of aspartic-succinimide copolymers, some hydrolysis of succinimide rings to the ring-open, aspartate form did occur at pH 11.3, as evidenced by a downward drift in pH that accompanied production of COOH groups during the hydrolysis. This was controlled by beginning the downward titration quickly, thus minimizing the time that the polymers were subjected to the mild, alkaline conditions at room temperature.

6. Inhibition of $CaCO_3$ Crystal Formation

A supersaturated solution of calcium carbonate was prepared with 10 mM $CaCl_2.2H_2O$ and 8 mM $NaHCO_3$ in artificial seawater (0.5 M NaCl, 0.011 M KCl). At pH 8.30, 20° C., with temperature held constant by use of a thermostated water bath, calcite crystals began to grow after an induction period of 6 to 10 minutes. Crystal formation was monitored continuously from the downward pH drift as $CO_3^{2-}$ ions were removed from solution and incorporated into the crystal lattice. In the presence of inhibitors, the induction period was lengthened and the rate of pH drift was decreased.

7. Calcium-Binding Assay

The ability of the polyaspartates and copolymers to bind calcium, for example as a chelating agent, was measured by use of a calcium electrode (Orion Research, Inc.) and a pH/mV meter (Fisher Scientific, model 925). Samples of 0.1 mole of polyaspartate or EDTA (Sigma, disodium salt, dihydrate) were dissolved in 100 ml of water. The solutions were then titrated with 100 µl increments of 1 mM $CaCl_2.2H_2O$. These titration curves were compared to control curves in which water without chelant additives was titrated.

II. EXAMPLES

Example 1

Thermal Polymerization of Monosodium Aspartate Prepared from Free Aspartic Acid A sample of 151 millimoles (20.1 g) of L-aspartic acid (Sigma Chemical, MW 133.1, anhydrous, reagent grade) was dissolved in 15 ml of 10 N NaOH (Fisher Scientific, certified, 150 millimoles). The solution was lyophilized to produce the monosodium salt of aspartic acid. This material was ground to a white powder by mortar and pestle and placed into a 150 ml beaker. This was heated at 220° C. in a muffle oven. Subsamples were taken every hour by spatula for 8 hours. By one hour, the water of condensation had evolved to such an extent that the very light and crusty product had expanded out of the beaker and onto the tray underneath. The expansion had ceased after about 1 hour. The color of the product remained light throughout, darkening slightly to a light tan by 8 hours. The product was a polymer of aspartate, as shown by amino acid analysis and infrared spectroscopy. No imide peaks were detected in either the bulk products or the dialyzed, purified materials. The products were completely soluble in water.

Example 2

Thermal Polymerization of Monosodium Aspartate Monohydrate

An amount of 10 grams of monosodium aspartate monohydrate (Sigma Chemical, MW 173.1) was placed in each of four, 600 ml beakers. The four beakers were placed in a large Pyrex baking dish and then put into a drying oven that was preheated to 220° C. and thermostated ±0.1° C. with a temperature controller (J-KEM Electronics). At five minutes, the temperature was 171° C., at 15 minutes 181° C., with no visible change in the fine, white powders. By 30 minutes, the temperature was 196° C., the samples appeared white, melted, bubbling, and had expanded to fill about 50% of the volume of the beakers. At 45 minutes, the temperature was 206° C., with the appearance of the samples unchanged except for more expansion. At 1 hour, the temperature was 216° C., the samples were off-white, and had expanded to form a muffin-like dome over the tops of the beakers as the water vapor of condensation carried the tacky material upwards. By 1.5 hours and continuing for the 24 hours of the experiment, the temperature had reached 220° C. and the samples had become light tan in color. A beaker containing a sample was removed from the oven, covered with aluminum foil, and allowed to cool to room temperature at 4, 8, 12, and 24 hours.

On cooling, the samples were quite hygroscopic, absorbing water rapidly from the air, collapsing the puffed material into a sticky, glassy state. This was lyophilized, which resulted in incomplete drying, then oven-dried at 120° C., to yield the dry, amber powders of sodium polyaspartate. These materials exhibited no imide peaks on infrared spectroscopy. Assuming loss of two molecules of water per residue of monosodium aspartate monohydrate that was incorporated into the polymer the theoretical yield per 10 grams of monomer was 7.92 grams. Actual yields were 7.45 g at 4 hours, 7.55 grams at 8 hours, 7.45 grams at 12 hours, and 7.16 grams at 24 hours.

Example 3

Thermal Polymerization of Monopotassium Aspartate

An amount of 10 grams of monopotassium aspartate (Sigma Chemical, MW=171.2) was placed in each of four, 600 ml beakers. The beakers were next put into a drying oven at 220° C. The reaction proceeded as described in example 2, the materials behaving the same as was observed in that experiment. On cooling to room temperature, the samples were hygroscopic, falling from the raised, puffed state to a viscous, caramel-colored liquid. The samples were taken up in 100 ml of distilled water each, transferred to a lyophilization flask, and lyophilized. These materials, as was also observed in experiment 2, did not release water readily and only slowly lyophilized but were more quickly and easily dried at 120° C. The samples exhibited no imide peaks on infrared spectroscopic analysis. Yields were 7.52 grams at 4 hours, 7.54 grams at 8 hours, 7.96 grams at 12 hours, and 7.12 grams at 24 hours.

Example 4

Thermal Polymerization of Monosodium Aspartate Monohydrate in the Presence of Powdered Stannous Chloride An amount of 10 grams of monosodium aspartate monohydrate was admixed with 1 gram of stannous chloride (Sigma Chemical) by stirring the powders thoroughly in each of four, 600 ml beakers. The beakers were placed in a drying oven which was preheated to 220° C. The reaction proceeded as in example 2, with behavior of the samples similar to that as described for that experiment. One noticeable difference was the presence of black particles, presumably the tin chloride, which remained mainly at the bottom of the beakers. Sodium polyaspartates were produced, showing no imide peaks by infrared spectroscopy. Yields were 8.17 grams at 4 hours, 8.72 grams at 8 hours, 8.04 grams at 12 hours, and 8.09 grams at 24 hours. The presence of the stannous compound, which is a Lewis acid, did not improve the polymerization or increase the molecular weight of the products.

Example 5

Thermal Polymerization of Monosodium Aspartate Monohydrate in the Presence of Stannous Chloride that was Coprecipitated with the Aspartate Monomer An amount of 10 grams of monosodium aspartate monohydrate and 1 gram of stannous chloride was prepared as in example 4 with the additional steps of codissolving the materials in 25 ml of water and drying at 130° C. to form a solid coprecipitate. The samples in the beakers were then heated at 220° C. as described above. In this case, the black particles of example 4 were not observed, presumably because the tin chloride was thoroughly dispersed in the coprecipitate. As also occurred in example 4, there was a strong ammonia-like aroma during the course of the reaction. The products of examples 4 and 5 were not so hygroscopic as in examples 1 to 3. However, again, there appeared to be no particular benefit to inclusion of the Lewis acid to the reaction mixture. The products were sodium polyaspartates, with no imide peaks in the infrared spectra. Yields were 7.28 grams at 4 hours, 7.16 grams at 8 hours, 6.87 grams at 12 hours, 7.07 grams at 24 hours.

Example 6

Thermal Polymerization of Hemimagnesium Aspartate Hydrate

Samples of 10 grams of hemimagnesium aspartate hydrate (Sigma Chemical, MW=171.2, 1.5 moles of water per mole of aspartate) was placed into each of four, 600 ml beakers and heated at 220° C. as described in example 2. Over the course of 24 hours, the samples did not melt, foam, or rise. By 45 minutes, the color of the samples was a light yellow, becoming slightly orange by 1 hour, somewhat darker by 2 hours to a peach-like color, then to a pink-tinged color by 2.5 hours, and progressing to a reddish tan by 3 hours. The first sample, taken at 4 hours, was tan and odorless, with the original powdery texture intact. The samples darkened somewhat over time, remaining as tan, nonhygroscopic powders. Polyaspartates were produced, having no imide peaks in the infrared spectra. Yields were 7.66 grams at 4 hours, 7.56 grams at 8 hours, 7.27 grams at 12 hours, 6.98 grams at 24 hours.

Example 7

Thermal Polymerization of Disodium Aspartate

A sample of 50 grams of L-aspartic acid was placed in a 1-liter beaker. To this, 50 ml of distilled water were added and magnetically stirred to form a slurry that contained 0.3755 moles of aspartic acid. Next, 75.1 ml of 10 N NaOH (Fisher Scientific) were slowly pipetted into the solution, thereby adding 0.751 moles of sodium (30.04 grams as NaOH). This solution was not lyophilizible, but was dried first at 120° C. for four hours to form a viscous liquid, then at 150° C. for four more hours which on cooling yielded a white, crystalline mass of disodium aspartate.

The beaker was placed in the drying oven at 220° C. At 30 minutes, the temperature, which had dropped to 192° C., was again at 220° C. The sample was bubbling vigorously, forming large bubbles, raising out of the beaker and into a Pyrex baking dish that held the beaker.

By 1 hour, the bubbling had ceased and the foam had solidified. The color of the sample was still white. By 3 hours, the sample had become light yellow, with a strong ammonia-like odor.

At 8 hours, the beaker was removed from the oven and covered with aluminum foil. The sample was tan in color. On cooling, the sample became sticky and had developed a peach-pink color. It was redried at 145° C. overnight, producing a slightly yellowish product. The sample had a strong, biting ammonia-like fragrance. The material was a polyaspartate with no imide peaks on infrared analysis. Yield=68.44 g.

Example 8

Thermal Polymerization of Aspartic Acid Dried from a Slurry at pH 1

A sample of 10 grams of L-aspartic acid was placed in a 600-ml beaker to which 100 ml of distilled water were added. The resulting slurry was magnetically stirred and the pH recorded as 2.90 by use of a pH electrode that was standardized to pH 1 using 0.1 N HCl. The pH of the slurry was adjusted to pH 1 by addition of concentrated HCl. The sample was dried at 120° C. for 6 hours, producing a hard, white, glassy puck. Next, the beaker was placed in an oven preheated to 220° C. At 15 minutes, the temperature was 196° C., with slight bubbling of the sample. At 30 minutes, the temperature was 211° C. and the sample had raised with bubbling to an appearance like bread dough. At 45 minutes, the temperature was 216° C., the sample continued to rise and had become cream-colored. There was some evolution of acidic fumes. At 1 hour, the temperature was 220° C., the sample was yellowish-tan, and had risen further but still well-contained in the beaker. The temperature remained at 220° C. thereafter. At 4 hours, the sample was honey-colored. At 8 hours, the sample was removed from the oven. It was tan, with a dried, bread-like appearance and texture. Yield=7.46 grams.

Example 9

Thermal Polymerization of Aspartic Acid Dried from a Slurry at pH 2

The procedure of example 8 was followed except that the electrode was standardized at pH 2 with 0.01 N HCl and the pH of the slurry was adjusted to pH 2. On drying, the sample was a hard, white, powdery puck. At 15 minutes of polymerization, there was no change in the appearance of the sample. At 30 minutes, it was light tan in color, at 45 minutes yellowish tan, at 1 hour pinkish tan, at 4 hours sandy pink, and at 8 hours tan. The sample remained a powdery puck throughout. Yield=7.51 grams.

Example 10

Thermal Polymerization of Aspartic Acid Dried from a Slurry at pH 3

The procedure of example 8 was followed except that the electrode was standardized at pH 3 with 0.001 N HCl and the pH of the slurry was adjusted to pH 3, which was very close to the unadjusted pH of the slurry as well. On drying, the sample was a hard, white, powdery puck. At 15 minutes of polymerization, there was no change in the appearance of the sample. At 30 minutes, it was light pink in color, at 45 minutes brighter pink, and at 8 hours tan. The sample remained a powdery puck throughout. Yield=7.66 grams.

Example 11

Thermal Polymerization of Aspartic Acid Dried from a Slurry at pH 4

The procedure of example 8 was followed except that the electrode was standardized with a pH 4 standard buffer (Fisher Scientific). The slurry was adjusted to pH 4 with 10 N NaOH. The sample would not dry at 120° C. for 16 hours, so was further dried at 140° C. for 8 hours into hard, white, powdery chips. At 15 minutes of polymerization, the temperature was 199° and the sample had not changed in appearance. At 30 minutes, the temperature was 213° C., the sample color was peachy-tan, and there was an elevation in the center as the sample had begun to rise. At 45 minutes, the temperature was 217° C., the color was the same, and the sample had risen to the top of the beaker. By 1 hour, the temperature had reached 220° C. and held there throughout the rest of the experiment. The appearance of the sample did not change other than becoming slightly pink by 8 hours. The beaker was removed at 8 hours, covered with aluminum foil, allowed to cool for about an hour, weighed, and placed in a sealed, plastic, sample bottle to avoid absorption of water from the atmosphere, as the sample was hygroscopic. Yield=7.35 grams.

Example 12

Thermal Polymerization of Aspartic Acid Dried from Solution at pH 5

The procedure of example 8 was followed except that the electrode was standardized by 2-point calibration using pH 4 and pH 7 standard buffers (Fisher Scientific). The slurry of aspartic acid in water at about pH 3 was adjusted to pH 5 with 10 N NaOH, becoming a clear solution in the process. On drying at 140° C. for 8 hours, the sample was a hard, transparent yellow disc with visible bubbles within the disc. The temperature course of the polymerization was the same as in example 11. At 15 minutes, the sample had risen to fill about 25% of the beaker and was off-white in color. At 30 minutes, the sample had risen to fill the beaker and was a pink-tan color. At 45 minutes, the sample had puffed well over the top of the beaker without falling into the containing dish, the color still pink to tan. The appearance of the sample did not change for the remainder of the experiment except that the color became more uniformly tan. Again, the sample was hygroscopic, so was quickly weighed on cooling and sealed in a sample bottle. Yield=9.42 grams.

Example 13

Thermal Polymerization of Aspartic Acid Dried from Solution at pH 6

The procedures and conditions of example 12 were followed except that the solution was adjusted to pH 6. On drying, the sample was a clear, slightly yellow, solid mass with cracks. At 15 minutes of polymerization the sample remained clear and had bubbled up to fill about 15% of the beaker. At 30 minutes, the sample was white and had risen to fill about 50% of the beaker. At 45 minutes, the sample was pink to tan in color and had risen over the top of the beaker without falling into the container dish. The appearance changed little after this, except for the color becoming more uniformly tan. The beaker was removed at 8 hours, covered, allowed to cool for an hour, the hygroscopic sample was quickly weighed and sealed in a sample bottle. Yield= 9.62 grams.

Example 14

Thermal Polymerization of Aspartic Acid Dried from Solution at pH 7

The procedures and conditions of example 12 were followed except that the solution was adjusted to pH 7. The course of the polymerization and appearance of this sample throughout was essentially the same as described in example 13. Yield=9.12 grams.

Example 15

Preparation of a Sulfonated Derivative of Polyaspartate by Aqueous Nucleophilic Addition to a Mixed Amide/Imide Copolymer of Aspartate and Succinimide The product of example 11, a copolymer of aspartate and succinimide, that was prepared by thermal synthesis of aspartic acid dried from a slurry at pH 4, was used in this experiment. A sample of 1.15 g this material representing approximately 10 millimoles, assuming an equal copolymer of Na-aspartate (residue MW 128) and succinimide (residue MW 97), was placed in a 100-ml beaker. To this were added 1.25 grams of amino-ethyl sulfonate (AES, Sigma Chemical, MW 125), also 10 millimoles. Next, 50 ml of distilled water were added with magnetic stirring to make a slurry. The slurry was titrated to pH 10 with 10 N NaOH (Fisher Scientific), measured by glass electrode standardized with pH 10 buffer (Fisher Scientific). The materials dissolved within a few minutes, with the pH held at 10 by manual titration for the first 5 minutes of the reaction. After this, the beaker was covered with parafilm (American National Can) and allowed to stir overnight.

A control beaker of the product of example 11 without addition of AES, prepared as a slurry in water as above, and manually titrated to pH 10 was also prepared. This sample required 1 hour of this treatment before fully dissolving. This beaker was also then covered and allowed to stir overnight. Both reactions were run at 24° C.

At the end of the experiment, the polyaspartate:AES solution was dark orange in color; the polyaspartate solution was darker reddish brown. The solutions were transferred to dialysis tubing (Spectrum, molecular weight cutoff=1000) and dialyzed against 4 liters of distilled water with three changes of water over an 8-hour period to remove any unreacted AES. The contents of the tubes were transferred to lyophilization flasks, shelled, and lyophilized. Yields: polyaspartate:AES=1.64 grams; polyaspartate=1.43 grams. The ratio of aspartate to AES on a residue basis in the copolymer was 10:1, as measured by amino acid analysis.

Example 16

Synthesis of a Sulfonated Copolymer of Polyaspartate by Dry Thermal Polymerization Starting with a Preformed Polysuccinimide 10:1 Aspartate:AES Polysuccinimide was prepared from aspartic acid by dry thermal polymerization at 220° C. for 8 hours. This polysuccinimide was base hydrolyzed at pH 10, 80° C., 1 hour to produce a solution of polyaspartate. This solution was dialyzed exhaustively against distilled water to produce a dialysant of sodium polyaspartate at pH 7. This was lyophilized to yield powdered sodium polyaspartate.

A sample of the polyaspartate of 13.7 g (0.1 mole residue basis, assuming the residue MW of monosodium aspartate is 137) was dissolved in 100 ml of distilled water in a 150 ml beaker with magnetic stirring. To this were added 1.251 grams of AES (10 millimoles). The solution was adjusted to pH 10 with 10 N NaOH to fully solubilize the AES. This solution was lyophilized to yield a crystalline tan salt of sodium polyaspartate and AES. The material was placed in a 250 ml beaker and polymerized at 200° C. for 8 hours in a preheated oven. The appearance of the material did not change significantly during this time. The sample was hard and brittle. It was ground by mortar, weighed, and stored in a sealed sample bottle. Yield=14.04 g.

Example 17

Synthesis of a Sulfonated Copolymer of Polyaspartate by Dry Thermal Polymerization Starting with a Preformed Polyaspartate 10:5 Aspartate:AES The polyaspartate and procedures of example 16 were followed except that a larger amount of AES was used (6.255 g, 50 millimoles). During the polymerization at 200° C. for 8 hours, the material rose quickly, almost filling the 250-ml beaker by 1 hour, rising still further to fill the beaker, then holding that appearance over the last 4 hours of the experiment. The product was cooled, mortared, and weighed, yield a golden brown powder. Yield=19.48 grams.

Example 18

Synthesis of a Sulfonated Copolymer of Polyaspartate by Dry Thermal Polymerization Starting with a Preformed Polyaspartate 10:10 Aspartate:AES The polyaspartate and procedures of example 16 were followed except that more AES was used (12.51 g, 0.1 mole). The solution of polyaspartate and AES was difficult to lyophilize, so it was oven-dried overnight at 120° C. in a 600 ml beaker, producing a dark orange, glassy salt of sodium polyaspartate and AES. On heating at 200° C. for 8 hours, the material bubbled and rose to fill about half of the beaker by 6 hours and holding that appearance. On cooling, it was hard and brittle, and was ground to a reddish brown and golden powder. The material towards the bottom of the beaker was darker, suggestive of uneven heat exchange during the reaction. The material was slightly hygroscopic. Yield=24.97 grams.

Example 19

The procedures and conditions of example 17 were followed, except that the amounts of the polyaspartate and AES were increased to 41.1 grams of polyaspartate (0.3 mole, residue basis) and 18.765 g of AES (0.15 mole). Reaction volumes were adjusted accordingly. The salts of polyaspartate and AES was prepared by oven-drying at 110° C. overnight. The polymerization was at 200° C. for 8 hours. Yield=58.37 g.

Example 20

The procedures and conditions of example 18 were repeated, except that the amounts of the polyaspartate and AES were increased to 41.1 grams of polyaspartate (0.3 mole, residue basis) and 37.53 grams of AES (0.3 mole). The salt of polyaspartate and AES was prepared from the solution by oven-drying at 110° C. overnight. The polymerization was at 200° C. for 8 hours. Yield=78.18 grams.

Example 21

Synthesis of a Phosphonated Copolymer of Polyaspartate by Dry Thermal Polymerization Starting with a Preformed Polysuccinimide 10:1 Aspartate:AEP Polysuccinimide was formed from L-aspartic acid by heating at 190° C. for 6 hours in the presence of polyphosphoric acid in a vacuum oven at a pressure of 0.07 bar. A sample of 250 grams of L-aspartic acid (Sigma Chemical) was mixed with 37.5 ml of polyphosphoric acid (Aldrich Chemical) at 80° C. to make a paste, which was then polymerized. The polyimide was filter-washed and dried. It was converted to polyaspartate by alkaline hydrolysis at pH 10, 80° C., for 1 hour. The solution of polyaspartate was dialyzed exhaustively against distilled water, then lyophilized to yield sodium polyaspartate.

A sample of 2.71 grams of this sodium polyaspartate was dissolved with 0.29 gram of amino-ethyl phosphonate (AEP, Sigma Chemical MW 125.1) in 30 ml of distilled water in a beaker. The solution was transferred to a test tube (150×22 mm), which was placed in a drying oven at 80° C. overnight, producing a dry, amber salt of sodium polyaspartate and AEP. The tube was then placed in a heating block at 200° C. and fitted with a rubber stopper with tubing for inflow and outflow. A nitrogen gas stream flowed through the tube to allow removal of the water of condensation. After 24 hours, the product was dissolved in 50 ml of water and dialyzed against 4 liters of water, with 3 changes of water, over 8 hours, using dialysis tubing (Spectrum, molecular weight cutoff=1000).

The dialysate was lyophilized. Yield=2.15 grams. The product was analyzed for infrared spectrum, MW by gel permeation, amino acid composition, phosphorus content, and activity as an inhibitor of crystallization. The MW was about 27,000 (number average), monodisperse). The polymer was free of imide residues based on the infrared spectrum. It contained about 5% by weight as phosphate and approximately 1 residue in 10 was AEP.

Example 22

Synthesis of a Copolymer of Sodium Aspartate and a Phosphonate by Thermal Polymerization of the Salt of the Comonomers A sample of 2.742 grams of L-aspartic acid (Sigma Chemical) plus 0.258 gram of aminoethyl phosphonate (AEP, Sigma Chemical) was slurried in 200 ml of distilled water to give a molar ratio of 10:1, aspartic acid:AEP. The monomers were made soluble by titration with 10 N NaOH, then the solution was lyophilized to make a sodium salt of the comonomers. This material was heated at 200° C. for 24 hours in a test tube (150×22 mm) in a heating block, thermostated at 200° C., with a stream of nitrogen to remove the water of condensation. On cooling, the white product was readily solubilized in 50 ml of water to form an amber solution, which was dialyzed versus 4 liters of distilled water with 3 changes of water over an 8 hour period. The dialysate was lyophilized, yielding 0.3 gram of products. The rest of the material was lost on dialysis through the membrane of molecular weight cutoff of 1000 (Spectrum). The product was an aspartate-rich copolymer, with a monomer ratio of ~10:1, aspartate:AEP, as shown by amino acid analysis and phosphate analysis. The infrared spectrum of the product revealed no imide residues.

Example 23

Thermal Treatment of an Admixture of Aspartic Acid and Aminoethyl Phosphonate

A sample of 2.742 grams of L-aspartic acid (Sigma Chemical) and 0.258 g of amino-ethyl sulfonate (Sigma Chemical) were mixed by mortar and pestle, placed into a test tube and heated at 240° C. for six hours using a heating block. The test tube was fitted with a stream of nitrogen to allow removal of the water of condensation. On cooling, the product was dialyzed versus four liters of distilled water, with changes of water after two, four, and six hours. The product was mainly a tan, water-insoluble polysuccinimide, as shown by the infrared spectrum. Amino acid analysis and phosphate analysis revealed minimal incorporation of amino-ethyl phosphonate into the insoluble product. There also was an amber, water-soluble fraction of the product. This was a copolymer of aspartic acid and AEP in a ratio of ~1:1, aspartic acid:AEP, as shown by amino acid analysis and phosphate analysis. The GPC MW's (number average) were 3400 for the polysuccinimide and 3000 for the copolymer.

The molecular weights of the products of this example and the other examples were determined by gel permeation (Table 1).

TABLE 1

Representative molecular weights of polyaspartate and related molecules of the present invention.

| Sample | Example | Estimated GPC MW* |
|---|---|---|
| Na L-Aspartate 220° C. | 2 | |
| 4 h | | 1,200 |
| 8 h | | 1,200 |
| 12 h | | 1,200 |
| 24 h | | 1,200 |
| L-Asp, pH 1 220° C., 8 h | 8 | 3,100 |
| L-Asp, pH 2 220° C., 8 h | 9 | 2,570 |
| L-Asp, pH 3 220° C., 8 h | 10 | 2,200 |
| L-Asp, pH 4 220° C., 8 h | 11 | 1,500 |
| L-Asp, pH 5 220° C., 8 h | 12 | 1,300 |
| L-Asp, pH 6 220° C., 8 h | 13 | 1,200 |
| L-Asp, pH 7 220° C., 8 h | 14 | 1,200 |
| L-Aspartic acid 220° C., 8 h | 16 | 5,000 |
| Polyaspartate:AES 10:1, 200° C., 8 h | 16 | 5,400 |
| Polyaspartate:AES 10:5, 200° C., 8 h | 17 | 7,100 |
| Polyaspartate:AES 10:10, 200° C., 8 h | 18 | 9,300 |
| L-Asp, polyphosphoric acid, 190° C., 6 h | 21 | 25,000 |

TABLE 1-continued

Representative molecular weights of polyaspartate and related molecules of the present invention.

| Sample | Example | Estimated GPC MW* |
|---|---|---|
| Polyaspartate:AEP 10:1, 200° C., 24 h | 21 | 27,000 |

*number-average, monodisperse products, polyaspartate standards

TABLE 2

Representative activities of polyaspartates and related molecules of the present invention as inhibitors of calcium carbonate formation.

| Sample | Example | Induction Period Prior to $CaCO_3$ Formation | Dose |
|---|---|---|---|
| none, control | — | 8.05 ± 2.1 (n = 6) | 0 |
| Na, L-Aspartate 220° C., 8 h | 2 | 27.0 ± 9.6 (n = 3) | 0.05 µg/ml |
| K, L-Aspartate 220° C., 8 h | 3 | 33.7 ± 11.2 (n = 3) | 0.05 µg/ml |
| L-Aspartic acid 220° C., 8 h | 16 | 28.7 ± 10.2 (n = 3) | 0.05 µg/ml |
| Polyaspartate:AES 10:1, 200° C., 8 h | 16 | 70.3 ± 14.1 (n = 3) | 0.05 µg/ml |

TABLE 3

Titratable carboxyl groups of polyaspartate, copolymers of aspartate and succinimide, and polysuccinimides.

| Sample | Example | µmoles $COO^-$/mg |
|---|---|---|
| L-Asp, pH 1 220° C., 8 h | 8 | 2.73 ± 0.10 (n = 3) |
| L-Asp, pH 2 220° C., 8 h | 9 | 4.33 ± 0.48 (n = 3) |
| L-Asp, pH 3 220° C., 8 h | 10 | 4.36 ± 0.15 (n = 3) |
| L-Asp, pH 4 220° C., 8 h | 11 | 5.73 ± 0.34 (n = 3) |
| L-Asp, pH 5 220° C., 8 h | 12 | 7.61 ± 0.16 (n = 4) |
| L-Asp, pH 6 220° C., 8 h | 13 | 7.59 ± 0.15 (n = 4) |
| L-Asp, pH 7 220° C., 8 h | 14 | 7.53 ± 0.09 (n = 3) |

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A method for preparing a polymer, comprising:
(i) heating a monomer preparation at a temperature of 140 to 350° C. for a time of 1 minute to 72 hours, to obtain a first polymer,
wherein said monomer preparation comprises a salt of aspartic acid selected from the group consisting of monosodium aspartate, monopotassium aspartate, hemimagnesium aspartate, disodium aspartate, and magnesium aspartate and wherein said monomer preparation further comprises a polyamine selected from the group consisting of aliphatic diamines, arylaliphatic diamines, polyoxyalkylene diamines, polyoxyalkylene triamines, triethylene tetraamines, and tetraethylene pentaamines.

2. The method of claim 1, wherein said monomer preparation further comprises polyaspartate.

3. The method of claim 2, wherein said polyaspartate has a gel permeation molecular weight of 1,000 to 100,000 daltons.

4. The method of claim 2, wherein said polyaspartate has a gel permeation molecular weight of 2,000 to 30,000 daltons.

5. The method of claim 2, wherein said polyaspartate is present in an amount of 25 to 95 mole %, based on the total moles of monomer units in said polyaspartate and said salt of aspartic acid.

6. The method of claim 2, wherein said polyaspartate is present in an amount of 50 to 90 mole %, based on the total moles of monomer units in said polyaspartate and said salt of aspartic acid.

7. The method of claim 1, wherein said monomer preparation further comprises aspartic acid.

8. The method of claim 7, wherein said monomer preparation comprises: (a) said aspartic acid in an amount of 5 to 95 mole %, based on the total moles of said monomer preparation; and (b) 5 to 95 mole % of said salt of aspartic acid, based on the total moles of said monomer preparation.

9. The method of claim 1, further comprising:
(ii) hydrolyzing said first polymer.

10. The method of claim 1, wherein said monomer preparation is heated at a temperature of 160 to 280° C. for a time of 1 to 24 hours.

11. The method of claim 1, wherein said monomer preparation is heated at a temperature of 200 to 240° C. for a time of 2 to 8 hours.

12. The method of claim 1, wherein said monomer preparation further comprises a polyamine selected from the group consisting of diaminopropane, diaminobutane, diaminopentane, diaminohexane, diaminoheptane, diaminooctane, ornithine, ornithine methyl ester, lysine, lysine methyl ester, spermine, and spermidine.

13. The method of claim 12, wherein said polyamine is present in said monomer preparation in an amount of 1 to 50 mole %, based on the total moles of polyamine and salt of aspartic acid.

14. The method of claim 12, wherein said polyamine is present in said monomer preparation in an amount of 5 to 15 mole %, based on the total moles of polyamine and salt of aspartic acid.

15. The method of claim 1, wherein less than 10% of monomer units of said first polymer contain a succinimide group.

16. The method of claim 1, wherein less than 1% of monomer units of said first polymer contain a succinimide group.

17. The method of claim 1, wherein said monomer preparation further comprises monoammonium aspartate.

18. A method for preparing a polymer, comprising:
(i) heating a monomer preparation at a temperature of 140 to 350° C. for a time of 1 minute to 72 hours, to obtain a first polymer,
wherein said monomer preparation comprises monosodium aspartate and wherein said monomer preparation further comprises a polyamine selected from the group consisting of aliphatic diamines, arylaliphatic diamines, polyoxyalkylene diamines, polyoxyalkylene triamines, triethylene tetraamines, and tetraethylene pentaamines.

19. The method of claim 18, wherein said monomer preparation further comprises polyaspartate.

20. The method of claim 19, wherein said polyaspartate has a gel permeation molecular weight of 1,000 to 100,000 daltons.

21. The method of claim 19, wherein said polyaspartate has a gel permeation molecular weight of 2,000 to 30,000 daltons.

22. The method of claim 19, wherein said polyaspartate is present in an amount of 25 to 95 mole %, based on the total moles of monomer units in said polyaspartate and said monosodium aspartate.

23. The method of claim 19, wherein said polyaspartate is present in an amount of 50 to 90 mole %, based on the total moles of monomer units in said polyaspartate and said monosodium aspartate.

24. The method of claim 18, wherein said monomer preparation further comprises aspartic acid.

25. The method of claim 24, wherein said monomer preparation comprises: (a) said aspartic acid in an amount of 5 to 95 mole %, based on the total moles of said monomer preparation; and (b) 5 to 95 mole % of said monosodium aspartate, based on the total moles of said monomer preparation.

26. The method of claim 24, further comprising:
(ii) hydrolyzing said first polymer.

27. The method of claim 24, wherein said monomer preparation is heated at a temperature of 160 to 280° C. for a time of 1 to 24 hours.

28. The method of claim 24, wherein said monomer preparation is heated at a temperature of 200 to 240° C. for a time of 2 to 8 hours.

29. The method of claim 24, wherein said monomer preparation further comprises a polyamine selected from the group consisting of diaminopropane, diaminobutane, diaminopentane, diaminohexane, diaminoheptane, diaminooctane, ornithine, ornithine methyl ester, lysine, lysine methyl ester, spermine, and spermidine.

30. The method of claim 29, wherein said polyamine is present in said monomer preparation in an amount of 1 to 50 mole %, based on the total moles of polyamine and monosodium aspartate.

31. The method of claim 29, wherein said polyamine is present in said monomer preparation in an amount of 5 to 15 mole %, based on the total moles of polyamine and monosodium aspartate.

32. The method of claim 18, wherein less than 10% of monomer units of said first polymer contain a succinimide group.

33. The method of claim 18, wherein less than 1% of monomer units of said first polymer contain a succinimide group.

34. The method of claim 18, wherein said monomer preparation further comprises monoammonium aspartate.

35. A method for preparing a polymer, comprising:
(i) heating a monomer preparation at a temperature of 140 to 350° C. for a time of 1 minute to 72 hours, to obtain a first polymer; and
(ii) hydrolyzing said first polymer,
wherein said monomer preparation comprises: (1) a salt of aspartic acid selected from the group consisting of monosodium aspartate, monopotassium aspartate, hemimagnesium aspartate, disodium aspartate, magnesium aspartate, and monoammonium aspartate; (2) aspartic acid; and (3) polyaspartate, and
wherein said aspartic acid is present in said monomer preparation in an amount of 5 to 95 mole %, based on the total moles of said monomer preparation, and said salt of aspartic acid is present in said monomer preparation in an amount of 5 to 95 mole %, based on the total moles of said monomer preparation.

36. The method of claim 35, wherein said polyaspartate has a gel permeation molecular weight of 1,000 to 100,000 daltons.

37. The method of claim 35, wherein said polyaspartate has a gel permeation molecular weight of 2,000 to 30,000 daltons.

38. The method of claim 35, wherein said polyaspartate is present in an amount of 25 to 95 mole %, based on the total moles of monomer units in said polyaspartate and said salt of aspartic acid.

39. The method of claim 35, wherein said polyaspartate is present in an amount of 50 to 90 mole %, based on the total moles of monomer units in said polyaspartate and said salt of aspartic acid.

40. The method of claim 35, wherein said monomer preparation is heated at a temperature of 160 to 280° C. for a time of 1 to 24 hours.

41. The method of claim 35, wherein said monomer preparation is heated at a temperature of 200 to 240° C. for a time of 2 to 8 hours.

42. The method of claim 35, wherein said monomer preparation further comprises a polyamine selected from the group consisting of diaminopropane, diaminobutane, diaminopentane, diaminohexane, diaminoheptane, diaminooctane, ornithine, ornithine methyl ester, lysine, lysine methyl ester, spermine, and spermidine.

43. The method of claim 42, wherein said polyamine is present in said monomer preparation in an amount of 1 to 50 mole %, based on the total moles of polyamine and salt of aspartic acid.

44. The method of claim 42, wherein said polyamine is present in said monomer preparation in an amount of 5 to 15 mole %, based on the total moles of polyamine and salt of aspartic acid.

45. The method of claim 35, wherein said monomer preparation further comprises a polyamine selected from the group consisting of aliphatic diamines, arylaliphatic diamines, polyoxyalkylene diamines, polyoxyalkylene triamines, triethylene tetraamines, and tetraethylene pentaamines.

46. The method of claim 35, wherein less than 10% of monomer units of said first polymer contain a succinimide group.

47. The method of claim 35, wherein less than 1% of monomer units of said first polymer contain a succinimide group.

* * * * *